(12) United States Patent
Park et al.

(10) Patent No.: US 10,397,541 B2
(45) Date of Patent: Aug. 27, 2019

(54) METHOD AND APPARATUS OF LIGHT FIELD RENDERING FOR PLURALITY OF USERS

(71) Applicant: Samsung Electronics Co., Ltd., Suwon-si, Gyeonggi-do (KR)

(72) Inventors: Juyong Park, Seongnam-si (KR); Dong Kyung Nam, Yongin-si (KR); Seok Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 140 days.

(21) Appl. No.: 15/041,584

(22) Filed: Feb. 11, 2016

(65) Prior Publication Data

US 2017/0041596 A1 Feb. 9, 2017

(30) Foreign Application Priority Data

Aug. 7, 2015 (KR) ........................ 10-2015-0111746

(51) Int. Cl.
*H04N 13/144* (2018.01)
*H04N 13/31* (2018.01)
(Continued)

(52) U.S. Cl.
CPC ......... *H04N 13/144* (2018.05); *H04N 13/305* (2018.05); *H04N 13/307* (2018.05); *H04N 13/31* (2018.05); *H04N 13/368* (2018.05); *H04N 13/376* (2018.05); *H04N 13/398* (2018.05)

(58) Field of Classification Search
CPC ........ G08B 13/19602; G08B 13/19604; G08B 13/19652; G08B 13/19606; H04N 13/305; H04N 13/368; H04N 13/351; H04N 13/376; H04N 13/144; H04N 13/31; H04N 13/307; H04N 13/398; G02B 27/2214

See application file for complete search history.

(56) References Cited

U.S. PATENT DOCUMENTS 5,959,664 A 9/1999 Woodgate
5,973,700 A * 10/1999 Taylor .................... G03B 35/14
345/427

(Continued)

FOREIGN PATENT DOCUMENTS

EP 1102106 A2 * 5/2001 ........... G02B 27/225
EP 2587814 A1 * 5/2013
(Continued)

OTHER PUBLICATIONS

European Search Report dated Jan. 5, 2017 issued in corresponding European Patent Application No. 16166077.4.
(Continued)

*Primary Examiner* — David E Harvey
(74) *Attorney, Agent, or Firm* — Harness, Dickey & Pierce, P.L.C.

(57) ABSTRACT

A rendering method for a plurality of users includes mapping positions of both eyes of a first user and positions of both eyes of a second user to a view area, the view area corresponding to a pixel. The method includes determining a value of the pixel based on the mapped positions of both eyes of the first user and the mapped positions of both eyes of the second user.

27 Claims, 22 Drawing Sheets

(51) Int. Cl.
*H04N 13/368* (2018.01)
*H04N 13/305* (2018.01)
*H04N 13/376* (2018.01)
*H04N 13/307* (2018.01)
*H04N 13/398* (2018.01)

(56) References Cited

U.S. PATENT DOCUMENTS

| | | | |
|---|---|---|---|
| 7,450,188 B2* | 11/2008 | Schwerdtner | G02B 27/225 348/E13.029 |
| 8,310,524 B2* | 11/2012 | Chen | G02B 27/0093 348/42 |
| 8,358,335 B2 | 1/2013 | de la Barre et al. | |
| 8,415,324 B2* | 4/2013 | Lassila | A61K 31/726 514/56 |
| 8,451,324 B2* | 5/2013 | Park | G02B 27/2214 348/51 |
| 8,487,983 B2 | 7/2013 | Nishioka et al. | |
| 9,291,828 B2* | 3/2016 | Kroll | G02B 27/0093 |
| 9,706,174 B2* | 7/2017 | Ayyildiz | F41G 1/38 |
| 9,746,684 B2* | 8/2017 | Kroll | G02B 27/22 |
| 9,791,934 B2* | 10/2017 | Itoh | H04N 13/0404 |
| 2003/0025995 A1* | 2/2003 | Redert | H04N 13/0404 359/464 |
| 2007/0188667 A1* | 8/2007 | Schwerdtner | G02B 27/225 349/15 |
| 2007/0247590 A1* | 10/2007 | Schwerdtner | H04N 13/305 353/7 |
| 2008/0007511 A1* | 1/2008 | Tsuboi | G02B 27/2214 345/102 |
| 2010/0295928 A1* | 11/2010 | De La Barre | G02B 27/2214 348/51 |
| 2011/0128356 A1* | 6/2011 | de la Barre | G09G 3/003 348/54 |
| 2011/0187825 A1* | 8/2011 | Gohl | H04N 13/31 348/46 |
| 2011/0216061 A1* | 9/2011 | De La Barre | G06T 15/00 345/419 |
| 2011/0216171 A1* | 9/2011 | Barre | H04N 13/04 348/51 |
| 2011/0228183 A1* | 9/2011 | Hamagishi | G02B 27/2214 349/15 |
| 2011/0310003 A1* | 12/2011 | de la Barre | H04N 13/0402 345/156 |
| 2011/0310092 A1* | 12/2011 | de la Barre | H04N 13/31 345/419 |
| 2011/0316985 A1* | 12/2011 | Ishikawa | G02B 27/2214 348/51 |
| 2011/0316987 A1* | 12/2011 | Komoriya | G06K 9/00228 348/51 |
| 2012/0044330 A1* | 2/2012 | Watanabe | G02B 27/2214 348/54 |
| 2012/0062556 A1* | 3/2012 | Yamamoto | H04N 13/0022 345/419 |
| 2012/0182292 A1* | 7/2012 | Shimoyama | G02B 27/0093 345/419 |
| 2012/0212486 A1* | 8/2012 | Van Der Horst | H04N 5/268 345/419 |
| 2013/0050197 A1* | 2/2013 | Oosawa | H04N 13/302 345/419 |
| 2013/0050440 A1* | 2/2013 | Kaseno | G06K 9/00228 348/51 |
| 2013/0050443 A1* | 2/2013 | Takahashi | H04N 13/398 348/51 |
| 2013/0050444 A1* | 2/2013 | Takimoto | H04N 13/398 348/51 |
| 2013/0050445 A1* | 2/2013 | Miyake | G02B 27/225 348/51 |
| 2013/0257928 A1* | 10/2013 | Lee | G02B 27/22 345/697 |
| 2013/0307948 A1* | 11/2013 | Odake | H04N 13/32 348/59 |
| 2014/0104392 A1* | 4/2014 | Thorn | G06F 3/013 348/46 |
| 2014/0254008 A1* | 9/2014 | Tanioka | G02B 27/2214 359/464 |
| 2014/0340746 A1* | 11/2014 | Watanabe | G09G 3/003 359/464 |
| 2015/0049176 A1* | 2/2015 | Hinnen | H04N 13/183 348/59 |
| 2015/0092026 A1* | 4/2015 | Baik | H04N 13/0018 348/54 |
| 2015/0138327 A1* | 5/2015 | Xu | H04N 13/0404 348/54 |
| 2015/0145977 A1* | 5/2015 | Hoffman | H04N 13/302 348/59 |
| 2015/0281682 A1* | 10/2015 | Van Der Horst | H04N 13/117 348/59 |
| 2015/0334369 A1* | 11/2015 | Bruls | H04N 13/111 348/43 |
| 2016/0021365 A1* | 1/2016 | Effendi | H04N 13/128 348/43 |
| 2016/0198150 A1* | 7/2016 | Meng | G02B 27/22 348/59 |
| 2016/0219268 A1* | 7/2016 | Strom | G06F 3/012 |
| 2017/0041596 A1* | 2/2017 | Park | H04N 13/0404 |
| 2017/0272735 A1* | 9/2017 | Aiden | H04N 13/0402 |

FOREIGN PATENT DOCUMENTS

| | | | | |
|---|---|---|---|---|
| EP | 2876879 A1 * | 5/2015 | | H04N 13/302 |
| JP | 6-148763 A | 5/1994 | | |
| JP | 2012-157008 A | 8/2012 | | |
| JP | 2013-055665 A | 3/2013 | | |
| JP | 2015-037282 A * | 2/2015 | | |
| JP | 2015-046693 A * | 3/2015 | | |
| JP | 2015-046694 A * | 3/2015 | | |
| JP | 2015-046695 A * | 3/2015 | | |
| KR | 2010-0033672 A | 3/2010 | | |
| KR | 2011-0020762 A | 3/2011 | | |
| KR | 20110049039 A | 5/2011 | | |
| KR | 2012-0109490 A | 10/2012 | | |
| KR | 2013-0061042 A | 6/2013 | | |
| KR | 10-1322910 B1 | 10/2013 | | |
| WO | WO-94/24601 A1 | 10/1994 | | |
| WO | WO-2012172766 A1 * | 12/2012 | | H04N 13/117 |
| WO | WO-2013/144773 A2 | 10/2013 | | |

OTHER PUBLICATIONS

European Office Action for corresponding European Application No. 16166077.4 dated Mar. 2, 2018.

* cited by examiner

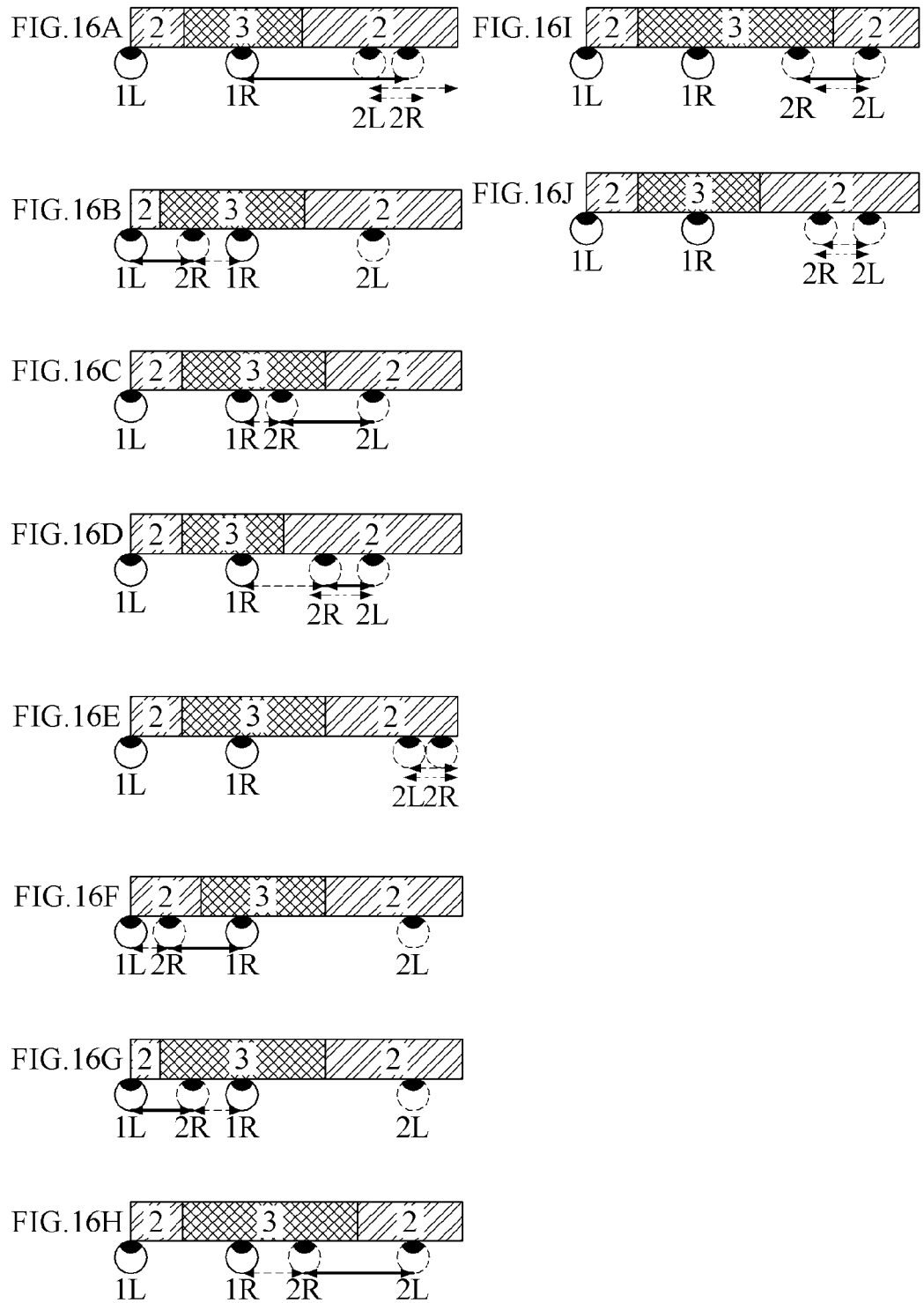

METHOD AND APPARATUS OF LIGHT FIELD RENDERING FOR PLURALITY OF USERS

CROSS-REFERENCE TO RELATED APPLICATION

This application claims under 35 U.S.C. § 119 claims Korean Patent Application No. 10-2015-0111746, filed on Aug. 7, 2015, in the Korean Intellectual Property Office, the entire contents of which are incorporated herein by reference in its entirety.

BACKGROUND

1. Field

At least one example embodiment relates to a rendering method and/or apparatus, and more particularly, to a rendering method and/or apparatus for a plurality of users.

2. Description of the Related Art

Many currently commercialized three-dimensional (3D) display devices provide depth perception by displaying different images on both eyes of a user. In this case, while binocular disparity information is transferred to the user, a monocular depth recognition factor, for example, a focal adjustment and a motion parallax, is not transferred to the user. Thus, a 3D image may be unnaturally displayed which may cause eyestrain.

3D display technologies for displaying the spatio-angular distribution of rays, that is, a light field are utilized to display an eyestrain-free and natural 3D image. Here, the light field refers to the distribution of rays based on positions or directions of rays output from an object. When optically displaying the light field on a surface, a user positioned behind the surface experiences the ray distribution as if an actual object is present and views a natural 3D image of the object.

SUMMARY

At least one example embodiment relates to a rendering method for a plurality of users.

In at least one example embodiment, the method may include mapping positions of both eyes of a first user and positions of both eyes of a second user to a view area corresponding to a pixel, and determining a value of the pixel based on the mapped positions of both eyes of the first user and positions of both eyes of the second user.

The view area may include a view cone corresponding to a pair of the pixel included in a panel and an optical element included in an optical layer.

The mapping may include mapping the positions of both eyes of the first user and the positions of both eyes of the second user to the view area based on an iterative characteristic by relative positions between the pixel and optical elements included in an optical layer.

The determining may include determining the value of the pixel to display a stereo image at the positions of both eyes of the first user in response to a ray direction of the pixel corresponding to the first user, and determining the value of the pixel to display a left image or a right image of the stereo image at a position of at least one of both eyes of the second user in response to the ray direction corresponding to the second user.

The ray direction may include a ray direction that is propagated through the pixel and an optical element included in an optical layer.

The determining may include determining the value of the pixel based on a left image of a stereo image in response to a ray direction of the pixel corresponding to a position of a left eye of the first user, and determining the value of the pixel based on a right image of the stereo image in response to the ray direction corresponding to a position of a right eye of the first user.

The determining may include determining the value of the pixel based on a left image of a stereo image for the first user in response to a ray direction of the pixel corresponding to a position of a left eye of the second user and the position of the left eye of the second user corresponding to a position of a left eye of the first user, and determining the value of the pixel based on a right image of the stereo image in response to the ray direction corresponding to the position of the left eye of the second user and the position of the left eye of the second user corresponding to a position of a right eye of the first user.

The determining may include determining the value of the pixel based on a left image of a stereo image for the first user or an image of a further left view than the left image in response to a ray direction of the pixel corresponding to a position of a left eye of the second user and a position of a right eye of the second user corresponding to a position of a left eye of the first user, and determining the value of the pixel based on the left image or a right image of the stereo image in response to the ray direction corresponding to the position of the left eye of the second user and the position of the right eye of the second user corresponding to a position of a right eye of the first user.

The determining may include determining the value of the pixel based on a left image of a stereo image for the first user in response to a ray direction of the pixel corresponding to a position of a right eye of the second user and the position of the right eye of the second user corresponding to a position of a left eye of the first user, and determining the value of the pixel based on a right image of the stereo image in response to the ray direction corresponding to the position of the right eye of the second user and the position of the right eye of the second user corresponding to a position of a right eye of the first user.

The determining may include determining the value of the pixel based on a left image of a stereo image for the first user or a right image of the stereo image in response to a ray direction of the pixel corresponding to a position of a right eye of the second user and a position of a left eye of the second user corresponding to a position of a left eye of the first user, and determining the value of the pixel based on the right image or an image of a further right view than the right image in response to the ray direction corresponding to the position of the right eye of the second user and a position of a left eye of the second user corresponding to a position of a right eye of the first user.

The determining may include determining the value of the pixel based on at least one of an order in which the positions of both eyes of the first user and the positions of both eyes of the second user are arranged within the view area and distances between the positions of both eyes of the first user and the positions of both eyes of the second user.

The determining may include dividing the view area into a plurality of sub-view areas based on the positions of both eyes of the first user and the positions of both eyes of the second user, and determining the value of the pixel based on contents of a sub-view area corresponding to a ray direction of the pixel.

The determining may include determining contents of a first sub-view area for the first user among the plurality of sub-view areas, and determining contents of a second sub-view area for the second user among the plurality of sub-view areas based on the contents of the first sub-view area.

At least one example embodiment relates to a rendering method for a plurality of users.

In at least one example embodiment, the method may include determining values of first pixels to display a stereo image at positions of both eyes of a first user, and determining values of second pixels excluding the first pixels to display an image associated with the stereo image at positions of both eyes of a second user, based on a correlation between the positions of both eyes of the first user and the positions of both eyes of the second user.

The image associated with the stereo image may include at least one of the stereo image, a left image of the stereo image, a right image of the stereo image, a stereo image of a further left view than the stereo image, and a stereo image of a further right view than the stereo image.

The determining of the values of second pixels may include the values of second pixels to display a left image or a right image of the stereo image at one or more positions of both eyes of the second user.

In response to the positions of both eyes of the first user and the positions of both eyes of the second user being mapped to a predefined view area, the correlation may include at least one of an order in which the mapped positions are arranged and distances between the mapped positions.

At least one example embodiment relates to a rendering apparatus for a plurality of users.

In at least one example embodiment, the rendering apparatus may include a sensor configured to photograph a first user and a second user, and a processor configured to map positions of both eyes of a first user and positions of both eyes of a second user to a view area corresponding to a pixel, and to determine a value of the pixel based on the mapped positions of both eyes of the first user and positions of both eyes of the second user. The pixel may be a subpixel.

The processor may be further configured to determine the value of the pixel based on a left image of a stereo image in response to a ray direction of the pixel corresponding to a position of a left eye of the first user, and to determine the value of the pixel based on a right image of the stereo image in response to the ray direction corresponding to a position of a right eye of the first user.

The processor may be further configured to determine the value of the pixel based on a left image of a stereo image for the first user in response to a ray direction of the pixel corresponding to a position of a left eye of the second user and the position of the left eye of the second user corresponding to a position of a left eye of the first user, and to determine the value of the pixel based on a right image of the stereo image in response to the ray direction of the pixel corresponding to the position of the left eye of the second user and the position of the left eye of the second user corresponding to a position of a right eye of the first user.

The processor may be further configured to determine the value of the pixel based on a left image of a stereo image for the first user or an image of a further left view than the left image in response to a ray direction of the pixel corresponding to a position of a left eye of the second user and a position of a right eye of the second user corresponding to a position of a left eye of the first user, and to determine the value of the pixel based on the left image or a right image of the stereo image in response to the ray direction corresponding to the position of the left eye of the second user and a position of a right eye of the second user corresponding to a position of a right eye of the first user.

The processor may be further configured to determine the value of the pixel based on a left image of a stereo image for the first user in response to a ray direction of the pixel corresponding to a position of a right eye of the second user and the position of the right eye of the second user corresponding to a position of a left eye of the first user, and to determine the value of the pixel based on a right image of the stereo image in response to the ray direction corresponding to the position of the right eye of the second user and the position of the right eye of the second user corresponding to a position of a right eye of the first user.

The processor may be further configured to determine the value of the pixel based on a left image of a stereo image for the first user or a right image of the stereo image in response to a ray direction of the pixel corresponding to a position of a right eye of the second user and a position of a left eye of the second user corresponding to a position of a left eye of the first user, and to determine the value of the pixel based on the right image or an image of a further right view than the right image in response to the ray direction corresponding to the position of the right eye of the second user and a position of a left eye of the second user corresponding to a position of a right eye of the first user.

The processor may be further configured to determine the value of the pixel based on at least one of an order in which the positions of both eyes of the first user and the positions of both eyes of the second user are arranged within the view area and distances between the positions of both eyes of the first user and the positions of both eyes of the second user.

The processor may be further configured to divide the view area into a plurality of sub-view areas based on the positions of both eyes of the first user and the positions of both eyes of the second user, and to determine the value of the pixel based on contents of a sub-view area corresponding to a ray direction of the pixel.

The processor may be further configured to determine contents of a first sub-view area for the first user among the plurality of sub-view areas, and to determine contents of a second sub-view area for the second user among the plurality of sub-view areas based on the contents of the first sub-view area.

According to at least one example embodiment, an apparatus includes a processor and a memory. The memory includes computer readable instructions, which when executed by the processor, cause the processor to determine a first viewing area associated with a region of a display for displaying an image to a first user. The computer readable instructions, when executed by the processor, cause the processor to convert positions of eyes of a second user from a second viewing area to the first viewing area, and determine a value of the region based on the converted positions of eyes of the second user and actual positions of eyes of the first user.

The computer readable instructions, when executed by the processor, cause the processor to render the image such that the region has the determined value in order to display a corresponding part of the image.

The image is a stereo image including a plurality view images, and the computer readable instructions, when executed by the processor, cause the processor to determine the value of the region based on i) one or more of the plurality of view images, ii) a relationship between the converted positions and the actual positions, and iii) a ray direction of the region. The ray direction may be a direction in which light passes from the region through a center of an optical element associated with the display.

The region may be a pixel, and the first viewing area may be a first viewing cone of the pixel. The second viewing area may be a second viewing cone of the pixel.

The region may be a sub-pixel of a pixel, and the first viewing area is a first viewing cone of the sub-pixel. The second viewing area may be a second viewing cone of the sub-pixel.

According to at least one example embodiment, a method includes determining a first viewing area associated with a region of a display for displaying an image to a first user. The method includes converting positions of eyes of a second user from a second viewing area to the first viewing area, and determining a value of the region based on the converted positions of eyes of the second user and actual positions of eyes of the first user.

The method includes rendering the image such that the region has the determined value in order to display a corresponding part of the image.

The image may be a stereo image including a plurality view images, and the determining a value determines the value based on i) one or more of the plurality of view images, ii) a relationship between the converted positions and the actual positions, and iii) a ray direction of the region. The ray direction may be a direction in which light passes from the region through a center of an optical element associated with the display.

The region may be a pixel, and the first viewing area may be a first viewing cone of the pixel. The second viewing area may be a second viewing cone of the pixel.

The region may be a sub-pixel of a pixel, and the first viewing area is a first viewing cone of the sub-pixel. The second viewing area may be a second viewing cone of the sub-pixel.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which:

FIGS. 16A-16J illustrate various examples in which the rendering apparatus determines an image based on positions of eyes of users in the same situation as FIG. 12B;

DETAILED DESCRIPTION

Figure 1:
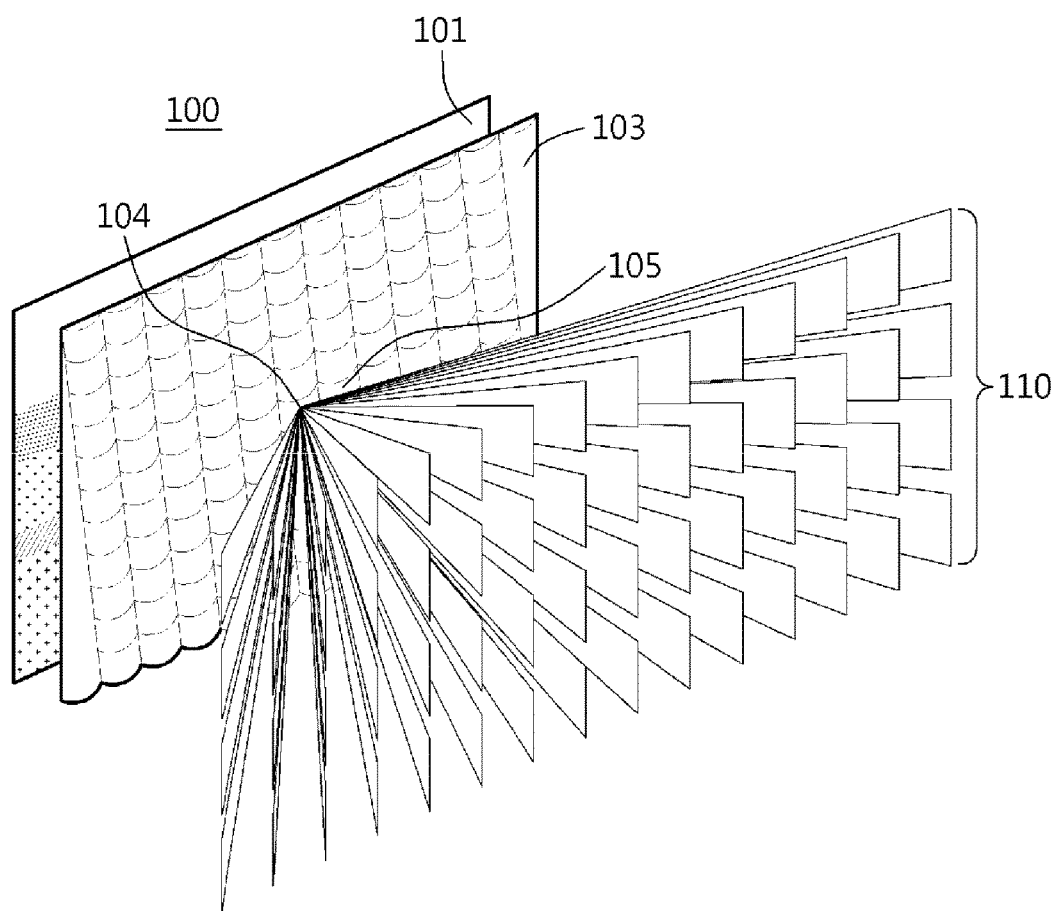
FIG. 1 illustrates an operation of a light field rendering apparatus according to at least one example embodiment.

Inventive concepts will now be described more fully with reference to the accompanying drawings, in which example embodiments of are shown. These example embodiments are provided so that this disclosure will be thorough and complete, and will fully convey inventive concepts of to those skilled in the art. Inventive concepts may be embodied in many different forms with a variety of modifications, and a few embodiments will be illustrated in drawings and explained in detail. However, this should not be construed as being limited to example embodiments set forth herein, and rather, it should be understood that changes may be made in these example embodiments without departing from the principles and spirit of inventive concepts, the scope of which are defined in the claims and their equivalents. Like numbers refer to like elements throughout. In the drawings, the thicknesses of layers and regions are exaggerated for clarity.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Specific details are provided in the following description to provide a thorough understanding of example embodiments. However, it will be understood by one of ordinary skill in the art that example embodiments may be practiced without these specific details. For example, systems may be shown in block diagrams so as not to obscure example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware in existing electronic systems (e.g., electronic imaging systems, image processing systems, digital point-and-shoot cameras, personal digital assistants (PDAs), smartphones, tablet personal computers (PCs), laptop computers, etc.). Such existing hardware may include one or more Central Processing Units (CPUs), digital signal processors (DSPs), application-specific-integrated-circuits (ASICs), field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible or non-transitory machine readable mediums for storing information. The term "computer-readable medium" may include, but is not limited to, portable or fixed storage devices, optical storage devices, and various other tangible or non-transitory mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors may be programmed to perform the necessary tasks, thereby being transformed into special purpose processor(s) or computer(s).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "includes", "including", "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "and/or" includes any and all combinations of one or more of the associated listed items. Expressions such as "at least one of," when preceding a list of elements, modify the entire list of elements and do not modify the individual elements of the list.

In the drawings, like reference numerals refer to like elements throughout. Further, the example embodiments to be described will be used for rendering of a light field display method. The light field display method refers to an autostereoscopic method that presents a three-dimensional (3D) image. For example, the light field display method may be applicable to a 3D television (TV), a 3D monitor, a 3D digital information display (DID), and a 3D mobile device.

FIG. 1 illustrates an operation of a light field rendering apparatus according to at least one example embodiment. FIG. 1 illustrates a configuration of a light field rendering apparatus 100.

The light field rendering apparatus 100 may represent light that is multi-directionally output from points present on a space. The light field rendering apparatus 100 employs a principle that an actual object generates or reflects light multi-directionally at a single point. The term "rendering" may refer to an operation of generating an image to be displayed on a panel 101 to generate a light field on a 3D space. For example, the "rendering" may be an operation of determining a value of a pixel or a subpixel included in the panel 101 to generate the light field on the 3D space.

The light field rendering apparatus 100 may include the panel 101 that includes pixels and an optical layer 103 that transmits light output from the pixels. The structure of subpixels that constitute the pixels of the panel 101 may be variously modified. For example, the panel 101 may be a red, green, blue (RGB) panel on which subpixels are aligned in a stripe pattern or a pan tile panel on which subpixels are aligned in a diamond pattern.

The light field rendering apparatus 100 may configure rays of different directions based on, for example, a pan tile panel. A general RGB panel has a subpixel structure in which a single pixel includes an R subpixel, a G subpixel, and a B subpixel, each having the same size. On the contrary, an R subpixel, a G subpixel, and a B subpixel included in the pan tile panel may have different sizes. The G subpixel and the R subpixel may be diagonally disposed in a single pixel. Further, the G subpixel and the B subpixel may be diagonally disposed in a single pixel. The arrangement of subpixels within a single pixel may be variously modified. In addition, the size and form of each of the R subpixel, the G subpixel, and the B subpixel may be variously modified.

The optical layer 103 may include an optical filter, for example, a lenticular lens, a parallax barrier, a lens array, and a micro-lens array. The optical layer 103 may include a directional backlight unit. In some example embodiments, in addition to the aforementioned optical filter, the optical layer 103 may include any type of optical layers that may be disposed on the front surface or the rear surface of a display.

A ray direction output from a subpixel included in the panel 101 may be determined through the optical layer 103. Light output from each subpixel may be irradiated in a specific direction while passing through the optical layer 103. Through this process, the light field rendering apparatus 100 may display a stereoscopic image (stereo image) or a multi-view image. An optical characteristic of the light field rendering apparatus 100 may include a characteristic associated with a ray direction of a subpixel included in the panel 101.

The optical layer 103 may include a plurality of optical elements 104 and 105. Each of the optical elements 104 and 105 may be referred to as a 3D pixel. A single 3D pixel may output a ray that includes different information in multiple directions. For example, rays 110 of 15×4 directions may be output from a single 3D pixel included in the optical layer 103. The light field rendering apparatus 100 may represent points on the 3D space using a plurality of 3D pixels.

Positions and/or sizes of subpixels within the panel 101 may vary based on a subpixel structure of the panel 101. Thus, a ray direction output from each subpixel within the panel 101 may vary based on the subpixel structure of the panel 101. Other details of the light rendering apparatus 100 are discussed with reference to FIG. 22.

Figure 2:
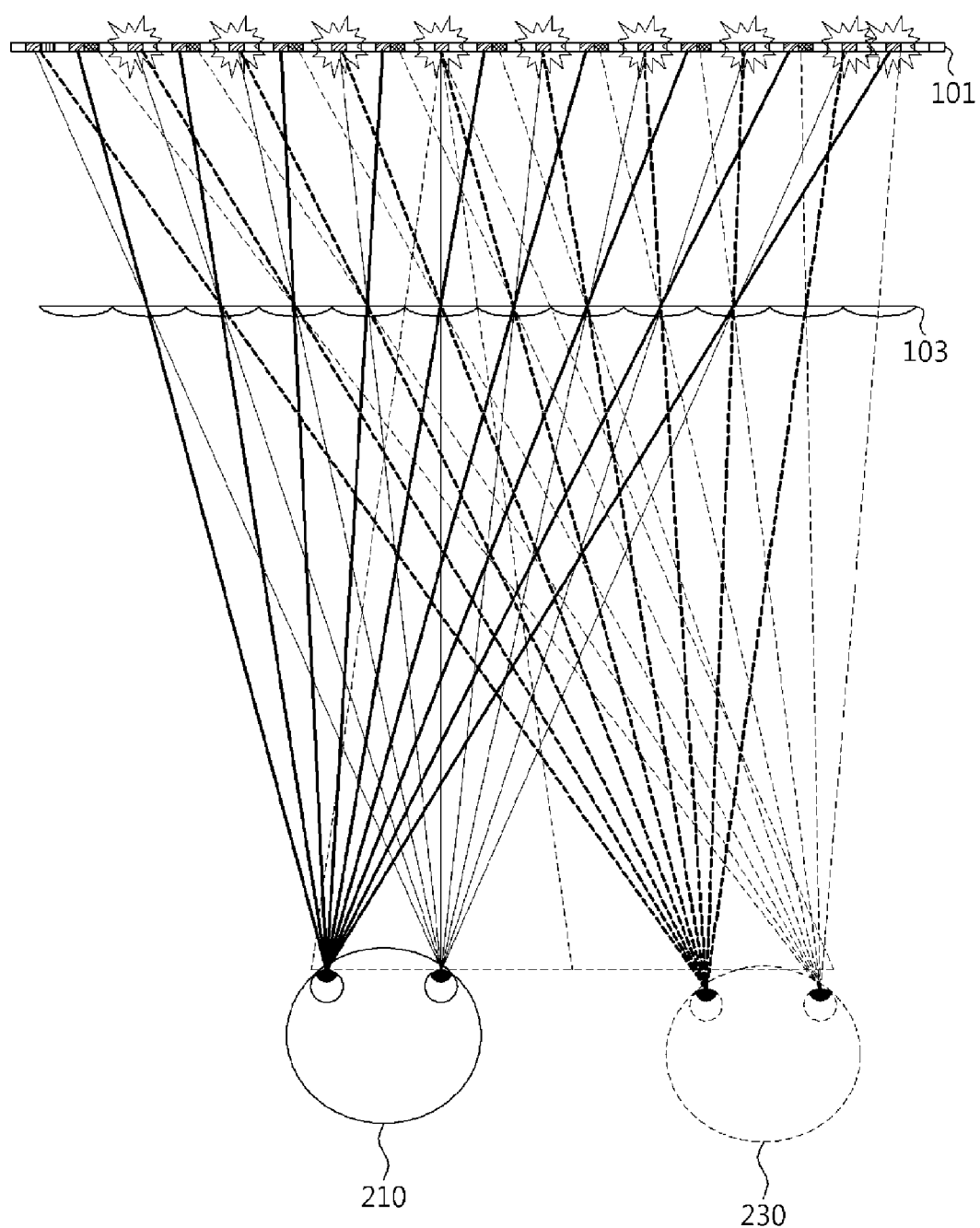
FIG. 2 illustrates an example of a viewing area of a light field rendering apparatus that includes a plurality of viewers according to at least one example embodiment.

FIG. 2 illustrates an example of a viewing area of a light field rendering apparatus that includes a plurality of viewers according at least one example embodiment. Hereinafter, for clarity, description will be made based on some example embodiments in which rendering is performed based on a subpixel unit. However, the light field rendering apparatus according to some example embodiments may be modified so that rendering may be performed based on a pixel unit. In this case, subpixels included in the same pixel may be correlated, such as having the substantially same progress direction of light.

FIG. 2 illustrates an example in which a ray direction of each of subpixels included in the panel 101 is in a direction in which a ray passes through a center of one of optical elements in the optical layer 103 and light propagated along ray directions of the subpixels reaches both eyes of a plurality of viewers 210 and 230.

Prior to describing a case associated with the viewers 210 and 230, when a single viewer is present within a viewing area of the light field rendering apparatus, an image corresponding to both eyes of the viewer may be determined as follows. For example, when light propagated along a ray direction of a subpixel is determined to reach to be closer to a left eye of the viewer than a right eye of the viewer, the subpixel may be determined to correspond to a left image. Also, when light propagated along a ray direction of a subpixel is determined to be closer to the right eye of the viewer than the left eye of the viewer, the subpixel may be determined to correspond to a right image.

Hereinafter, an example in which the plurality of viewers 210 and 230 are present in the viewing area of the light field rendering apparatus and independently determines viewing positions will be described.

A relatively large number of views or rays are used to represent, that is, display a wide viewing angle and different images at a distance between both eyes of each viewer within the viewing angle in order to represent a viewing area that includes the plurality of viewers 210 and 230. If the number of views or the number of rays used in a single subpixel increases, a resolution of a single view image displayed by the light field rendering apparatus may decrease.

In addition, if the number of views or the number of rays used in a single subpixel increases, crosstalk may occur in a viewing angle of each of the viewers 210 and 230 due to interference between the relatively large number of views or rays.

Figure 3:
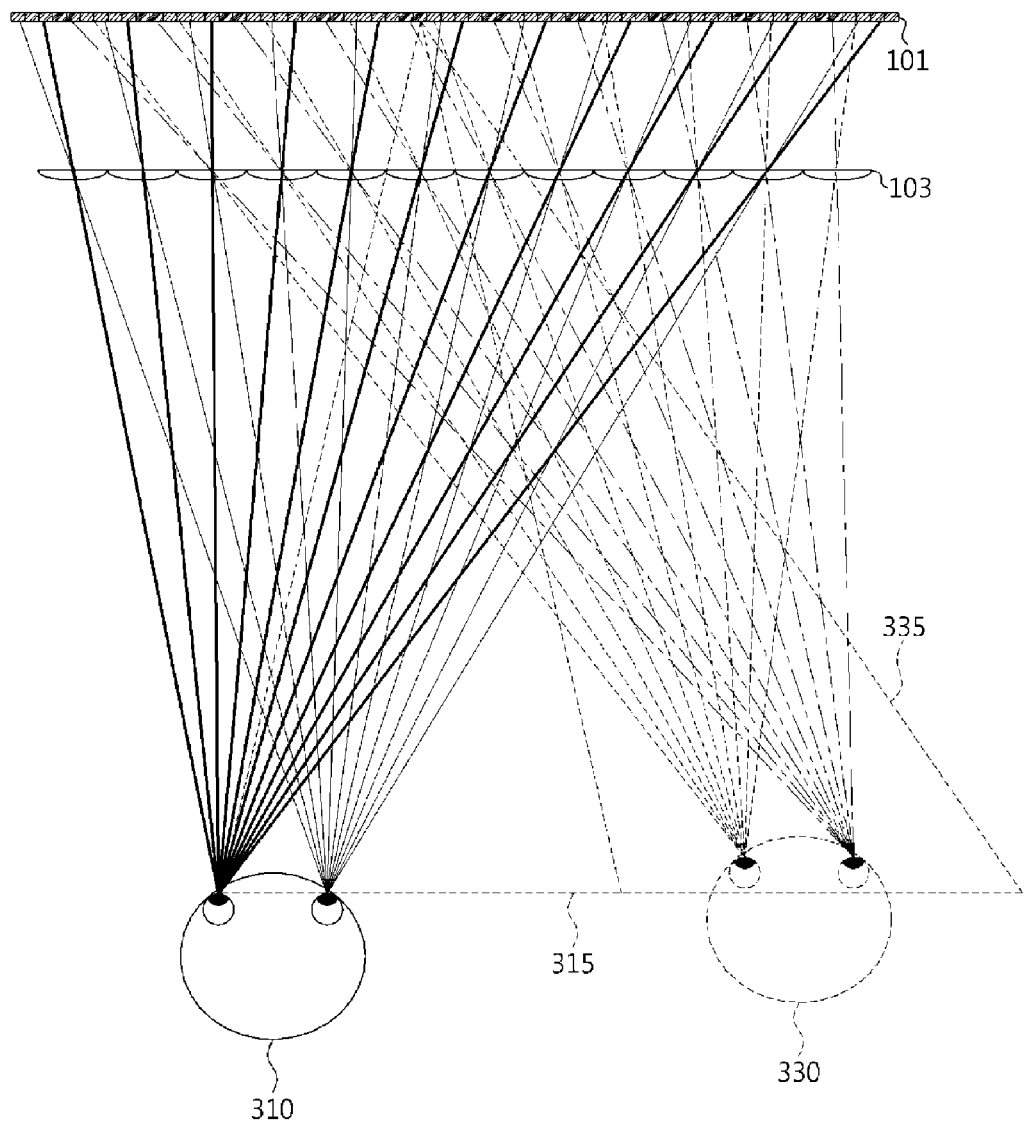
FIG. 3 illustrates a light field rendering process according to at least one example embodiment.

FIG. 3 illustrates a light field rendering process according to at least one example embodiment. FIG. 3 illustrates an example in which a plurality of viewers 310 and 330 are present in a viewing area of a light field rendering apparatus (hereinafter, a rendering apparatus) according to some example embodiments and the plurality of viewers 310 and 330 is present in different view areas, for example, a first view area 315 and a second view area 335, instead of being present in a single view area. The rendering apparatus may be configured using a software module, a hardware module, or various combinations of the software module and the hardware module. For example, the rendering apparatus may include a combination of elements from FIG. 1 and FIG. 22. In another example, the rendering apparatus may be implemented by the processor (i.e., special purpose processor) 2010 in FIG. 22.

The rendering apparatus may configure rays of different directions using a lens. Here, the panel 101 may include subpixels for displaying an image. The optical layer 103 is a set of optical elements that serve to limit light output from each subpixel in a specific direction.

The rendering apparatus may determine a priority of each viewer and may display an image for a viewer having a relatively high (or highest) priority. The rendering apparatus may determine a priority for each of viewers and may display an image to a viewer having a relatively high priority. The rendering apparatus may achieve a light field rendering for a plurality of viewers by determining which contents to be displayed on which eye of which viewer based on relationships between rays from the respective subpixels and ray directions toward eyes of the viewers. Hereinafter, among the plurality of viewers, a viewer having a top priority is referred to as a first user and a viewer having a next high priority is referred to as a second user.

A priority of a viewer may be determined using a variety of methods. For example, the priority may be determined by receiving an input from one of viewers. To this end, a variety of input interfaces, for example, an input through an external input device such as a remote controller and a smartphone, an input through a motion or gesture recognition, and an input through voice recognition, may be provided. Alternatively, the priority may be automatically determined using a facial recognition method. For example, faces of viewers may be recognized using a vision sensor, and the priority may be determined based on a list of the recognized viewers and main users registered in advance. The aforementioned methods are examples and thus, a method of determining a priority of a viewer may be variously modified.

Referring to FIG. 3, when a plurality of users is present, the rendering apparatus may define an area corresponding to a width of a view area based on a left eye of the first user 310 and may display eye directions of all of the users within the defined area. When an eye of the second user 330 is present in the second view area 335 adjacent to the first view area 315, the rendering apparatus may move (or convert) a position of the eye of the second user 330 and display the eye of the second user 330 in a direction corresponding to the first view area 315. This process is referred to as an eye mapping process (or eye converting process) herein, and is further described with reference to FIG. 6.

The rendering apparatus may determine a ray direction range in which an image for both eyes is to be displayed based on directions of both eyes mapped in a single view area. This process is referred to as a ray direction range determining process herein. The ray direction range determining process will be described with reference to FIGS. 8 through 10.

The rendering apparatus may determine an image or contents to be displayed on both eyes based on a size of a direction range and an arrangement order with respect to both eyes mapped in a single view area. For example, the rendering apparatus may determine a view image or contents to be mapped to a ray incident in a ray direction range based on directions of both eyes. This process is referred to as a contents determining process. The contents determining process will be described with reference to FIGS. 11 through 17I.

During the contents determining process, when center directions of neighboring ray direction ranges are close to each other within a certain size, the rendering apparatus may determine the same image or contents to be displayed in the neighboring ray direction ranges. If different images are displayed in an example in which the center directions of the neighboring ray direction ranges are close to each other within the certain size, crosstalk may occur. In this example, the rendering apparatus may maintain an image for the first user 310 by enabling the first user to view a designated 3D image, for example, a 3D image of a pair of a number 2 image and a number 3 image at all times. Further, the rendering apparatus may define a minimum ray direction range required for the first user 310 to view the designated 3D image, and may not determine an image in a direction range less than the minimum ray direction range.

When the first user 310 is capable of viewing the designated 3D image at all times through the aforementioned process, the rendering apparatus may use remaining pixel resources, excluding minimum pixel resources used to display an image or contents for the first user 310, to display an image or contents for other users including the second user 330.

The rendering apparatus may determine a value of a subpixel for an image or contents that is to be displayed in a ray direction range including a ray direction from a subpixel, which is determined based on a positional relationship between the optical layer 103 and the subpixel included in the panel 101. A process of determining a value of a subpixel will be described with reference to FIG. 18.

According to some example embodiments, a high resolution may be achieved using a characteristic that a view area provided from each of subpixels of a panel is repeated. Also, according to some example embodiments, it is possible to reduce (or alternatively, prevent) the occurrence of crosstalk by interference between a relatively large number of views or rays within a viewing angle of each user, for example, the first user 310 and the second user 320, by displaying the same image on one eye of the first user 310 and one eye of the second user 330.

Figure 4:
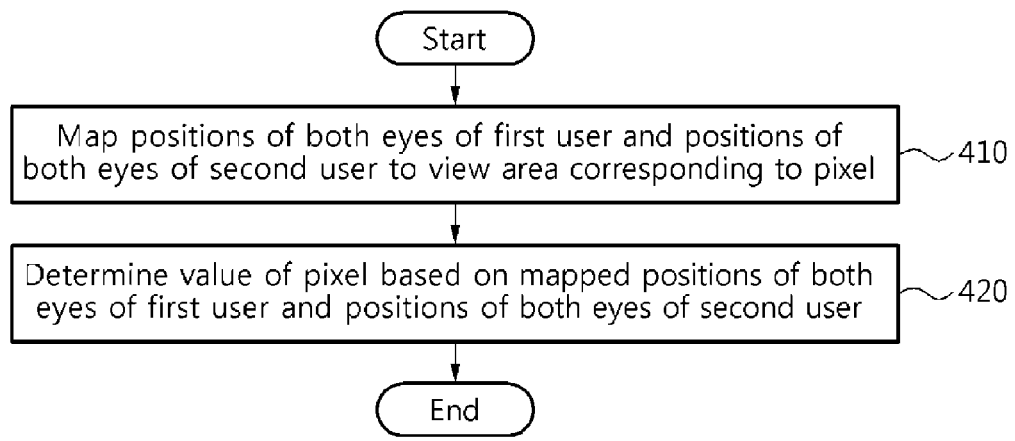
FIG. 4 is a flowchart illustrating an example of a light field rendering method according to at least one example embodiment.

FIG. 4 is a flowchart illustrating an example of a light field rendering method according to at least one example embodiment.

Referring to FIG. 4, in operation 410, the rendering apparatus maps positions of both eyes of a first user and positions of both eyes of a second user to a view area corresponding to a region of the display (e.g., a pixel). Here, the view area (or viewing area) may include a view cone corresponding to a pair of the pixel included in a panel and an optical element included in an optical layer. For example, the rendering apparatus may map the positions of both eyes of the first user and the positions of both eyes of the second user to the view area based on an iterative characteristic by relative positions between the pixel and optical elements included in an optical layer.

In operation 420, the rendering apparatus determines a value of the (region of the display (e.g., a pixel) based on the mapped positions of both eyes of the first user and positions of both eyes of the second user. For example, when a ray direction of the pixel corresponds to the first user, the rendering apparatus may determine the value of the pixel to display a stereo image at the positions of both eyes of the first user. When the ray direction corresponds to the second user, the rendering apparatus may determine the value of the pixel to display a left image or a right image of the stereo image at a position of at least one of both eyes of the second user. In this example, the ray direction may include a ray direction that is propagated through the pixel and an optical element included in an optical layer.

As described above, the rendering apparatus may perform rendering based on a subpixel unit. In this example, the term "pixel" used in operations 410 and 420 may be understood as a subpixel. The rendering apparatus may determine a value of a subpixel as expressed by Table 1, based on a position of an eye of a user that maps a ray direction of the subpixel in operation 410.

Hereinafter, in Table 1, for clarity, a left eye of the first user is expressed as "1L", a right eye of the first user is expressed as "1R", a left eye of the second user is expressed as "2L", and a right eye of the second user is expressed as "2R". Also, the symbol "≈" used in Table 1 may indicate that positions of eyes of user positioned on the left and the right of the symbol correspond to each other. The symbol may indicate that a position of an eye of the first user and a position of an eye of the second user are adjacent to each other in a minimum distance for image separation and display. For example, '2L≈1L' may indicate an example in which a distance between 2L and 1L is minimum among i) a distance between 2L and 1L, ii) a distance between 2L and 1R, iii) a distance 2R and 1L, and iv) a distance 2R and 1R.

TABLE 1

| Ray direction of subpixel | Positional relationship between eyes of users | Value of subpixel |
|---|---|---|
| 1L | | $2^{nd}$ view |
| 1R | | $3^{rd}$ view |
| 2L | 2L ≈ 1L | $2^{nd}$ view |
| | 2L ≈ 1R | $3^{rd}$ view |
| | 2R ≈ 1L | $1^{st}$ view or $2^{nd}$ view |
| | 2R ≈ 1R | $2^{nd}$ view or $3^{rd}$ view |
| 2R | 2R ≈ 1L | $2^{nd}$ view |
| | 2R ≈ 1R | $3^{rd}$ view |
| | 2L ≈ 1L | $2^{nd}$ view or $3^{rd}$ view |
| | 2L ≈ 1R | $3^{rd}$ view or $4^{th}$ view |

Referring to Table 1, when a ray direction of a subpixel corresponds to the mapped position of the left eye of the first user (ray direction: 1L), the rendering apparatus may determine a value of the subpixel based on a left image (2nd view) of a stereo image. Also, when the ray direction of the subpixel corresponds to the mapped position of the right eye of the first user (ray direction: 1R), the rendering apparatus may determine the value of the subpixel based on a right image (3rd view) of the stereo image.

When the ray direction of the subpixel corresponds to the mapped position of the left eye of the second user (ray direction: 2L), the rendering apparatus may determine the value of the subpixel based on a positional relationship between eyes of users. For example, when the position of the left eye of the second user corresponds to the position of the left eye of the first user (2L≈1L), the rendering apparatus may determine the value of the subpixel based on the left image (2nd view) of the stereo image for the first user. In this example, since displaying the 2nd view on the left eye of the first user is to be guaranteed, a value of a subpixel for the left eye of the second user is determined based on the 2nd view. Also, when the position of the left eye of the second user corresponds to the position of the right eye of the first user (2L≈1R), the rendering apparatus may determine the value of the subpixel based on the right image of the stereo image for the first user. In this example, since displaying the 3rd view on the right eye of the first user is to be guaranteed, a value of a subpixel for the left eye of the second user is determined based on the 3rd view.

Further, when the mapped position of the right eye of the second user corresponds to the position of the left eye of the first user (2R≈1L), the rendering apparatus may determine the value of the subpixel based on the left image of the stereo image for the first user or an image of a further left view than the left image. Since displaying the 2nd view on the left eye of the first user is to be guaranteed, the 2nd view is to be displayed on the right eye of the second user. In this example, a value of a subpixel for the left eye of the second user may be determined based on the 1st view or the 2nd view.

For example, when it is possible to provide a stereo image to the second user based on a relative positional relationship between users, a value of a subpixel for the left eye of the second user may be determined based on the 1st view. In this example, since the 2nd view is displayed on the right eye of the second user and the 1st view is displayed on the left eye of the second user, the second user may view the stereo image. As another example, when it is impossible to provide a stereo image to the second user based on a relative positional relationship between users, a value of a subpixel for the left eye of the second user may be determined based on the 2nd view. In this example, since the 2nd view is displayed on both eyes, that is, the right eye and the left eye, of the second user, the second user may view a mono image.

Further, when the position of the right eye of the second user corresponds to the position of the right eye of the first user (2R≈1R), the rendering apparatus may determine the value of the subpixel based on the left image or the right image of the stereo image. Here, since displaying the 3rd view on the right eye of the first user is to be guaranteed, the 3rd view is to be displayed on the right eye of the second user. In this example, a value for a subpixel for the left eye of the second user may be determined based on the 2nd view, that is, the stereo image, or the 3rd view, that is, the mono image.

When the ray direction of the subpixel corresponds to the position of the right eye of the second user (ray direction: 2R), the rendering apparatus may determine the value of the subpixel based on a positional relationship between users. For example, when the position of the right eye of the second user corresponds to the position of the left eye of the first user (2R≈1L), the rendering apparatus may determine the value of the subpixel based on the left image (2nd view) of the stereo image for the first user. Also, when the position of the right eye of the second user corresponds to the position of the right eye of the first user (2R≈1R), the rendering apparatus may determine the value of the subpixel based on the right image (3rd view) of the stereo image. Also, when the position of the left eye of the second user corresponds to the position of the left eye of the first user (2≈1L), the rendering apparatus may determine the value of the subpixel based on the left image (2nd view) of the stereo image for the first user or the right image (3rd view) of the stereo image. Also, when the position of the left eye of the second user corresponds to the position of the right eye of the first user (2L≈1R), the rendering apparatus may determine the value of the subpixel based on the right image (3rd view) or an image (4th view) of a further right view than the right image.

According to some example embodiments, a method of determining a value of a subpixel may be applied alike to an example in which the number of users is three or more in addition to an example in which the number of users is two. In this instance, a value of a subpixel for three or more users may be determined in the same manner as the case in which the number of users is two.

In view of the above and the following description, it should be understood that the rendering apparatus may determine the value of a region (e.g., a pixel or subpixel) based on i) one or more of a plurality of view images from a stereo image, ii) a relationship between converted positions of eyes of the second user (e.g., user 630) and the actual positions of eyes of the first user (e.g., user 510), and iii) a ray direction of the region, where the ray direction is a direction in which light passes from the region through a center of an optical element (e.g., from optical layer 103) associated with the display. Various situations that may occur based on a position of an eye of each user to be mapped in a ray direction and a relationship between eyes of users will be described with reference to FIGS. 13A through 17I. Hereinafter, a method of detecting positions of eyes of users prior to mapping positions of both eyes of each user to a view area corresponding to a subpixel will be described.

Figure 5:
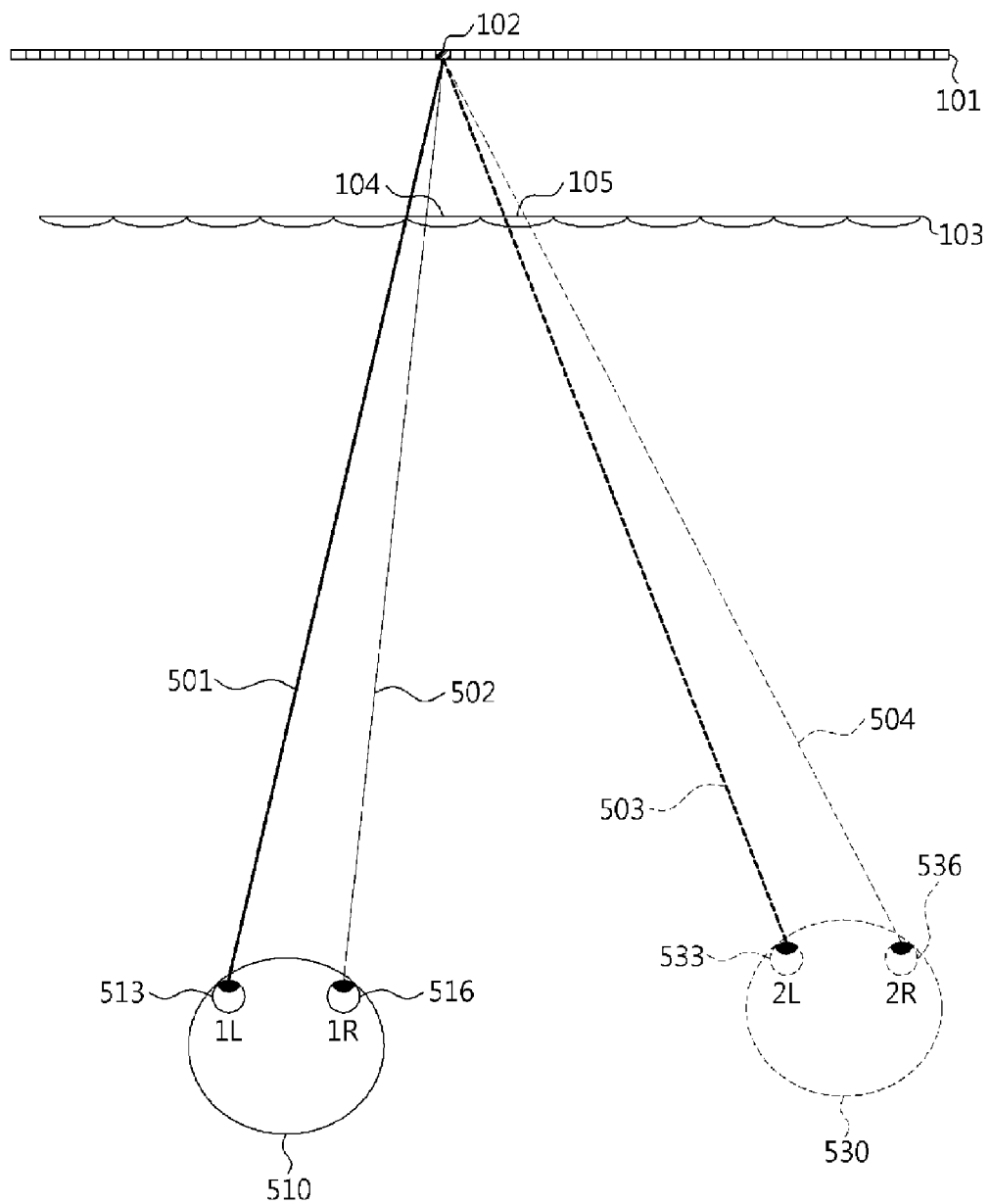
FIG. 5 illustrates a process of a light field rendering apparatus that detects positions of eyes of users according to at least one example embodiment.

FIG. 5 illustrates a process of a rendering apparatus that detects positions of eyes of users according to at least one example embodiment. FIG. 5 illustrates an example in which a direction of light from the subpixel 102 included in the panel 101 of the rendering apparatus toward a first user 510 passes an area of the optical element 104 included in the optical layer 103 and a direction toward a second user 530 passes an area of the optical element 105.

The subpixel 102 may output light multi-directionally. A direction in which light is output from the subpixel 102 may also be referred to as a ray direction. The light output from the subpixel 102 may be output in a form so that ray directions are quantized while the light is passing through the optical layer 103. For example, ray directions output from the subpixel 102 may be quantized to directions in which the rays pass centers of the optical elements 104 and 105 included in the optical layer 103, respectively.

Here, a direction 501 from the subpixel 102 toward a left eye 1L 513 of the first user 510 and a direction 502 from the subpixel 102 toward a right eye 1R 516 of the first user 510 are assumed to pass the area of the optical element 104. Also, a direction 503 from the subpixel 102 toward a left eye 2L 533 of the second user 530 and a fourth direction 504 from the subpixel 102 toward a right eye 2R 536 of the second user 530 are assumed to pass the area of the optical element 105.

The rendering apparatus may receive first information that includes positions of both eyes, for example, the left eye 1L and the right eye 1R, of the first user 510 and second information that includes both eyes, for example, the left eye 2L and the right eye 2R, of the second user 530. The rendering apparatus may receive signals that include information about positions of both eyes of a user from a sensor that tracks positions of both eyes of each user. Also, the rendering apparatus may determine directions from the subpixel 102 toward both eyes of each user based on positions of eyes of each user.

The rendering apparatus may determine an eye that corresponds to the subpixel 102 between a left eye and a right eye of each user, based on directions toward both eyes of each user.

The rendering apparatus may calculate a ray direction of the subpixel 102. For example, rays output from the subpixel 102 may be propagated in directions in which the rays pass through centers of the optical elements 104 and 105 included in the optical layer 103. The rendering apparatus may calculate the ray direction of the subpixel 102 based on at least one of a distance between the panel 101 and the optical layer 103, a position of the subpixel 102 in the panel 101, a position of the optical element 104 or 105 passed by a ray output from the subpixel 102 among elements included in the optical layer 103. Hereinafter, light output from a subpixel may include light output from a self-luminous subpixel, such as a light emitting diode (LED), and light output from a subpixel that transmits light of a backlight, such as a liquid crystal display (LCD).

Light propagated along a ray direction of the subpixel 102 may correspond to a view of the first user 510 or the second user 530. The rendering apparatus may select a view of a user corresponding to a position arrived at by the light that is propagated along the ray direction of the subpixel 102.

Although an operation method of the rendering apparatus that determines a view corresponding to a subpixel and an area corresponding to the subpixel based on a ray direction of the subpixel is described above, the example embodiments may be modified to an operation method of the rendering apparatus that acquires a view corresponding to a subpixel and an area corresponding to the subpixel from a table (e.g., a Lookup Table (LUT)).

For example, when criteria for photographing a multi-view image, for example, a distance for photographing the multi-view image, an angle of view for photographing the multi-view image, a direction for photographing the multi-view image, and a camera parameter for the multi-view image, are standardized, a view corresponding to a subpixel and an area corresponding to the subpixel may be determined. The table may store information associated with views and areas corresponding to subpixels included in the panel 101, based on a subpixel structure. In this case, the rendering apparatus may determine a view corresponding to a subpixel and an area corresponding to the subpixel by referring to the table.

Figure 6:
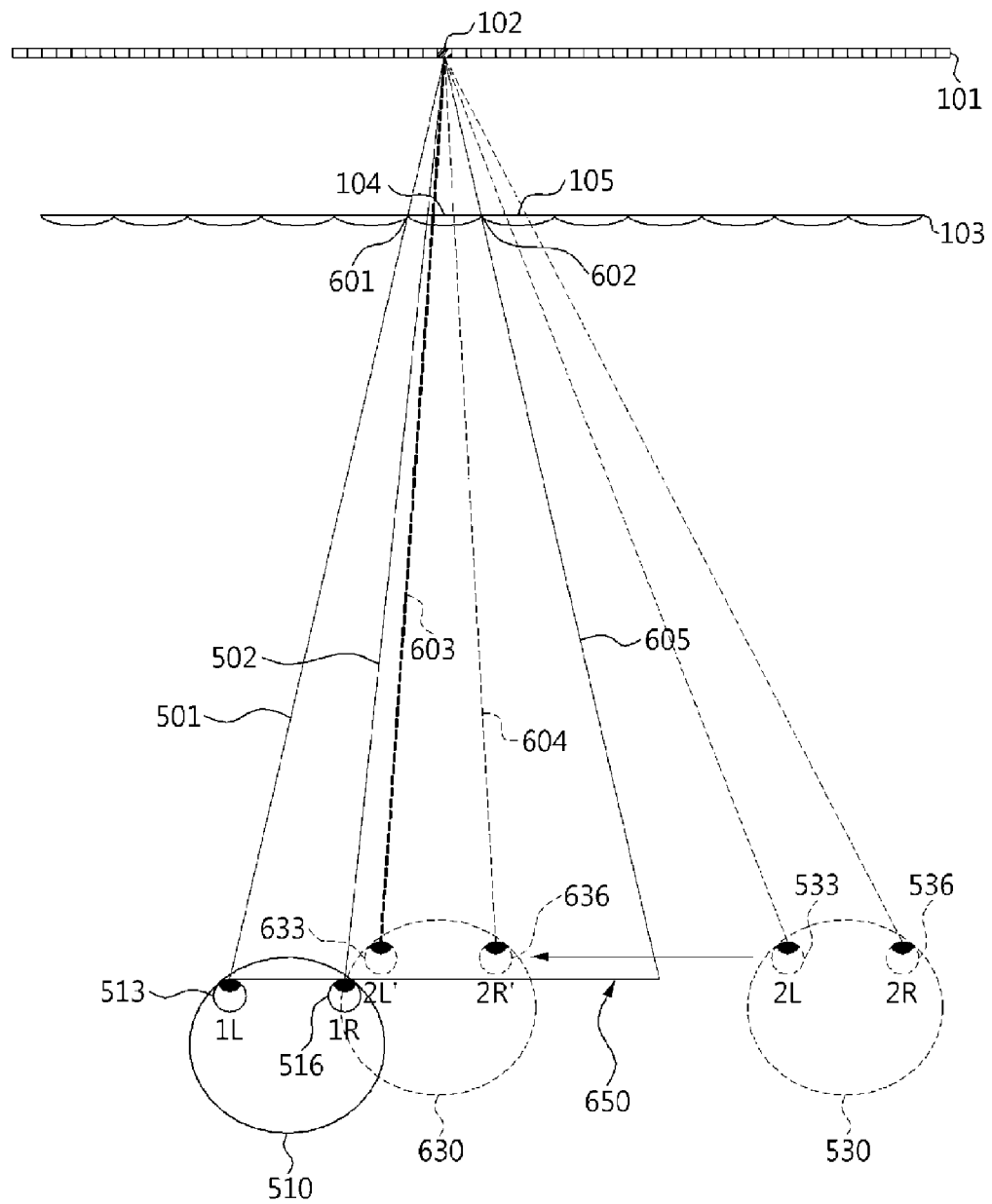
FIG. 6 illustrates a process of a light field rendering apparatus that maps views of users according to at least one example embodiment.

FIG. 6 illustrates a process of a rendering apparatus that maps views of users according to at least one example embodiment.

FIG. 6 illustrates a result of mapping directions from a subpixel towards both eyes of each user to a direction corresponding to a single view cone.

Referring to FIG. 6, a second position 602 spaced apart from a first position 601 at which the direction 501 passes the optical layer 103 by a width of a single optical element, for example, the optical element 104, may be defined. Here, a direction range corresponding to the subpixel 102 of the panel 101 and the optical element 104 included in the optical layer 103 may be defined as a viewing area (e.g., a view cone or viewing cone) 650. That is, a direction range between the direction 501 that passes the first position 601 based on the subpixel 102 and a direction 605 that passes the second position 602 based on the subpixel 102 may be defined as the view cone 650.

The rendering apparatus may determine a view cone size based on, for example, a pattern period of the optical layer 103 and a distance between the optical layer 103 and the panel 101 that includes the subpixel 102. A method of determining, by the rendering apparatus, a view cone size will be described with reference to FIG. 7.

The rendering apparatus calculates ray directions from the subpixel 102 toward eyes of each user, and maps the directions toward the eyes of each user to a direction corresponding to a single view cone.

The rendering apparatus may calculate a ray direction from each subpixel toward each eye of each user. Here, the rendering apparatus may determine a direction range corresponding to a single view cone 650 based on an eye direction of a user having a top priority, for example, a direction of the left eye 1L 513 of the first user 510. The rendering apparatus may map an eye direction of a user, for example, the second user 530, outside the direction range corresponding to the view cone 650 to be within the direction range of the view cone 650. In other words, the rendering apparatus may convert positions of eyes of a second user from one viewing area (e.g., see view cone 335 in FIG. 3) to another viewing area (e.g., view cone 650). The rendering apparatus may then determine a value of the subpixel 102 based on the converted positions of eyes of the second user 633 and 636 and actual positions of eyes of the first user 513 and 516 (see, for example, FIG. 18).

As described above with reference to FIG. 5, light propagated toward the left eye 2L 533 and the right eye 2R 536 of the second user 530 has passed the area of the optical element 105 and thus, may be regarded to be absent within the view cone 650. In this example, when light provided to both eyes of the second user 530 is converted to pass through the area of the optical element 104 instead of passing through the area of the optical element 105, the second user 530 may be converted to a position shown by a second user 630. Also, a position of the left eye 2L 533 may be converted to a new position, that is, a left eye 2L' 633 and the right eye 2R 536 may be converted to a new position, that is, a right eye 2R' 636. Further, the direction 503 may be converted to a new direction, that is, a direction 603 and the direction 504 may be converted to a new direction, that is, a direction 604.

The above conversions may be performed since a relationship between a ray that passes through the optical element 105 from the subpixel 102 and the directions 503 and 504 is the same as a relationship between a ray that passes through the optical element 104 from the subpixel 102 and the directions 603 and 604.

The rendering apparatus may obtain the directions 501, 502, 603, and 604 by mapping the directions 501, 502, 503, and 504 towards both eyes of the first user 510 and the second user 530 to be within the view cone 650.

The rendering apparatus may map eye directions of each user based on a single view cone, and may determine a ray direction range in which an image is to be displayed on both eyes based on the mapped eye directions. For example, the ray direction range may be determined as a range corresponding to a width of a desired (or alternatively, pre-defined) direction difference. A method of determining a ray direction range will be described with reference to FIGS. 8 through 10. Hereinafter, an operation of the rendering apparatus will be described based on a position of the second user 630 mapped within the view cone 650.

Figure 7A:
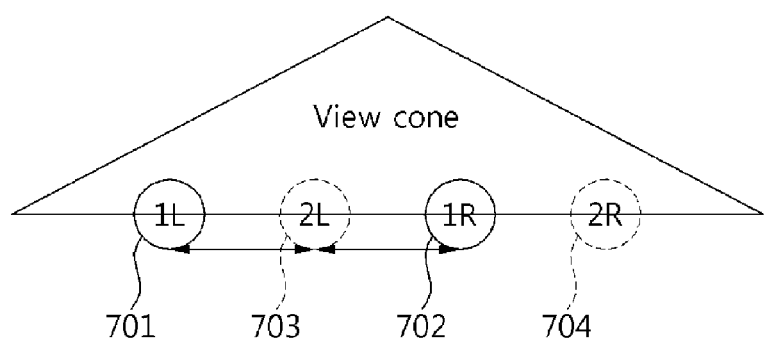
FIGS. 7A and 7B illustrate a process of determining a size of a view cone according to at least one example embodiment.
Figure 7B:
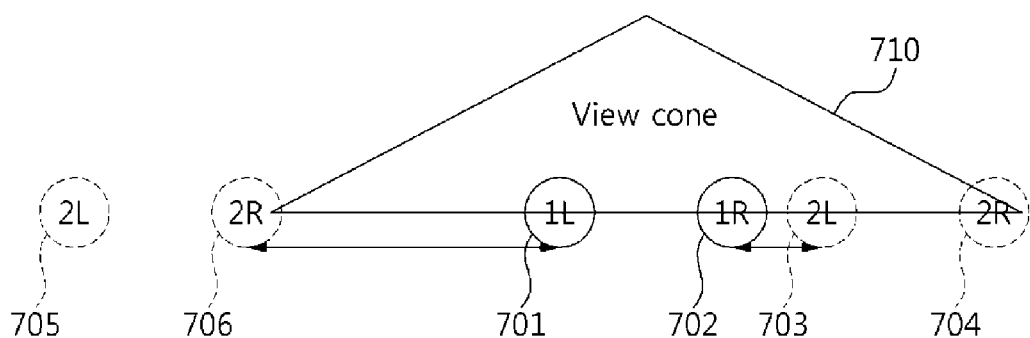

FIGS. 7A and 7B illustrate a process of determining a size of a view cone (or viewing area) according to at least one example embodiment.

FIGS. 7A and 7B illustrate both eyes, for example, a left eye 1L 701 and a right eye 1R 702 of a first user and both eyes, for example, a left eye 2L 703 or 705 and a right eye 2R 704 or 706 of a second user.

Both eyes of the first user have 1 inter-pupil distance (IPD) between the left eye 1L 701 and the right eye 1R 702. Here, an IPD denotes a distance between centers of pupils of both eyes. When both eyes of the second user are outside both eyes of the first user, a minimum separable distance, for example, 0.5 IPD or more, based on any one eye of the first user is required. The minimum separable distance may be defined as a minimum distance desired for reducing (or alternatively, preventing) crosstalk from occurring between different contents.

Referring to FIG. 7A, when one eye, for example, the left eye 2L 703 of the second user is positioned at the center between the left eye 1L 701 and the right eye 1R 702 of the first user, the left eye 2L 703 of the second user displays the same image as one for any one eye of both eyes, for example, the left eye 1L 702 and the right eye 1R 702, of the first user.

In an example in which the left eye 2L 703 of the second user is assumed to display the same image as one for the right eye 1R 702 of the first user, a minimum separable distance, for example, 0.85 IPD, may be set to reduce (or alternatively, prevent) the occurrence of crosstalk regardless of allocating images to the left eye 1L 701 of the first user and the left eye 2L 703 of the second user that display different images.

An example in which both eyes, for example, the left eye 2L 703 and the right eye 2R 704, of the second user are to be positioned within a view cone 710 together with both eyes, for example, the left eye 1L 701 and the right eye 1R 702, of the first user will be described with reference to FIG. 7B.

When the left eye 2L 703 of the second user is positioned further to the right by 0.5 IPD or more than the right eye 1R 702 of the first user or when the right eye 2R 706 of the second user is positioned further to the left than the left eye 1L 701 of the first user, contents for both eyes of each user may be effectively separated. When the view cone 710 has a size of 3 IPDs or more in an optimal viewing distance, the rendering apparatus may effectively separate contents for the respective two users. The rendering apparatus may determine the view cone 710 for two users to have a size of 3 IPDs or more within the optimal viewing distance.

Figure 8:
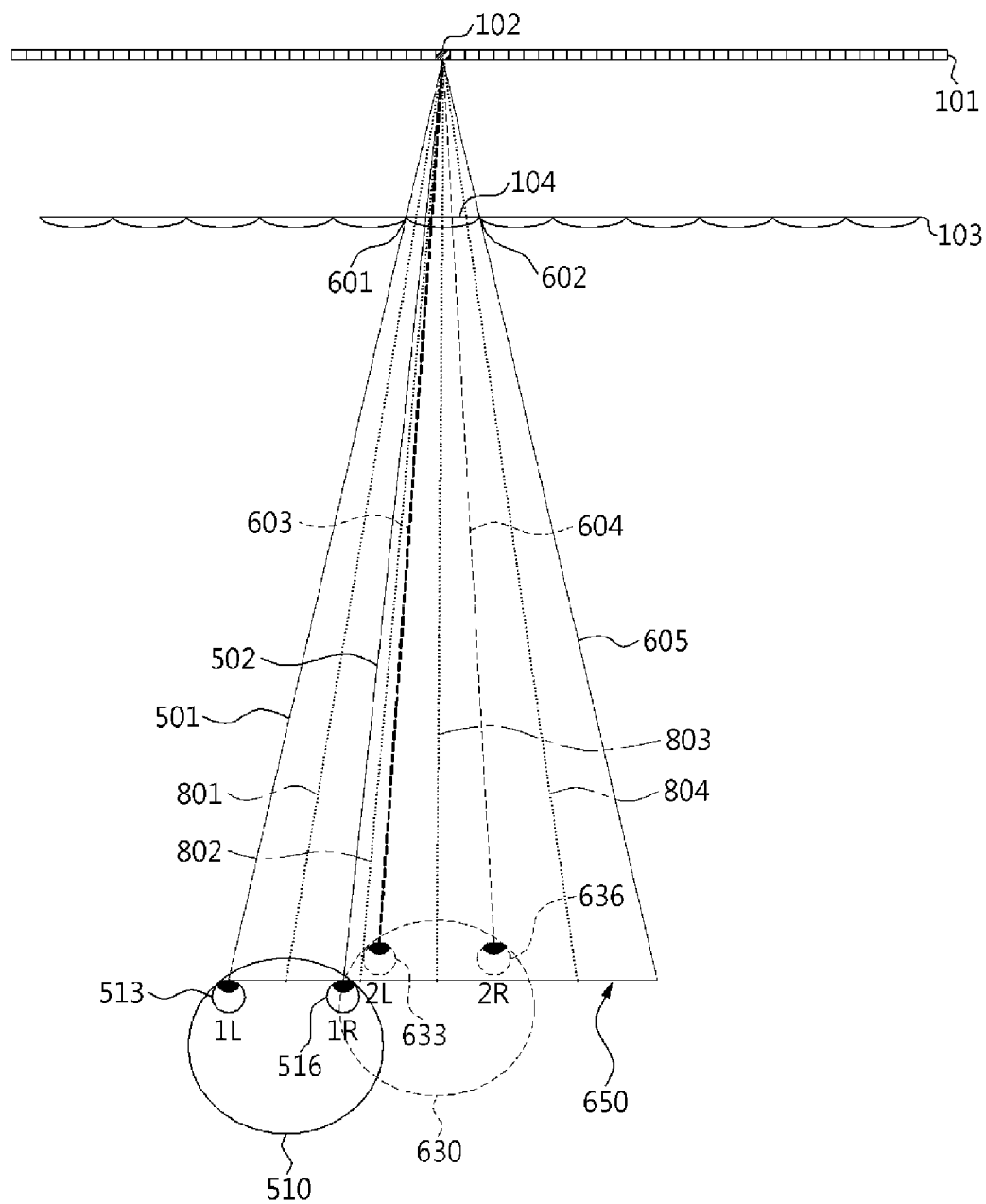
FIGS. 8 to 10 illustrate a process of a light field rendering apparatus that determines a ray direction range according to at least one example embodiment.

FIG. 8 illustrates an example of a process of a rendering apparatus that determines a ray direction range according to at least one example embodiment. Hereinafter, a method of determining, by the rendering apparatus, a ray direction range by using an intermediate value between directions toward the respective eyes as a boundary will be described with reference to FIG. 8.

The rendering apparatus may determine, as boundaries, of ray direction ranges corresponding to the respective eyes, directions 801, 802, 803, and 804 corresponding to intermediate values between the respective directions 501, 502, 603, 604, and 605. The directions 501, 502, 603, 604, and 605 correspond to directions in which light from the subpixel 102 passes through the optical element 104 toward the respective eyes.

For example, the rendering apparatus may determine an area between the directions 501 and 801 and an area between the directions 804 and 605 as a ray direction range for the left eye 1L 513 of the first user 510 and may determine an area between the directions 801 and 802 as a ray direction range for the right eye 1L 513 of the first user 510. Further, the rendering apparatus may determine an area between the directions 802 and 803 as a ray direction range for the left eye 2L 633 of the second user 630 and may determine an area between the directions 803 and 804 as a ray direction range for the right eye 2R 636 of the second user 630.

Hereinafter, a portion of areas determined by a boundary of a ray direction range for an eye of each user in a desired (or alternatively, predefined) view area (or viewing area), for example, the view cone 650, corresponding to the subpixel 102 will be referred to as a sub-view area (or sub-viewing area). For example, an area between the directions 501 and 801, an area between the directions 804 and 605, an area between the directions 801 and 802, an area between the directions 802 and 803, and an area between the directions 803 and 804 may be sub-view areas.

Figure 9:
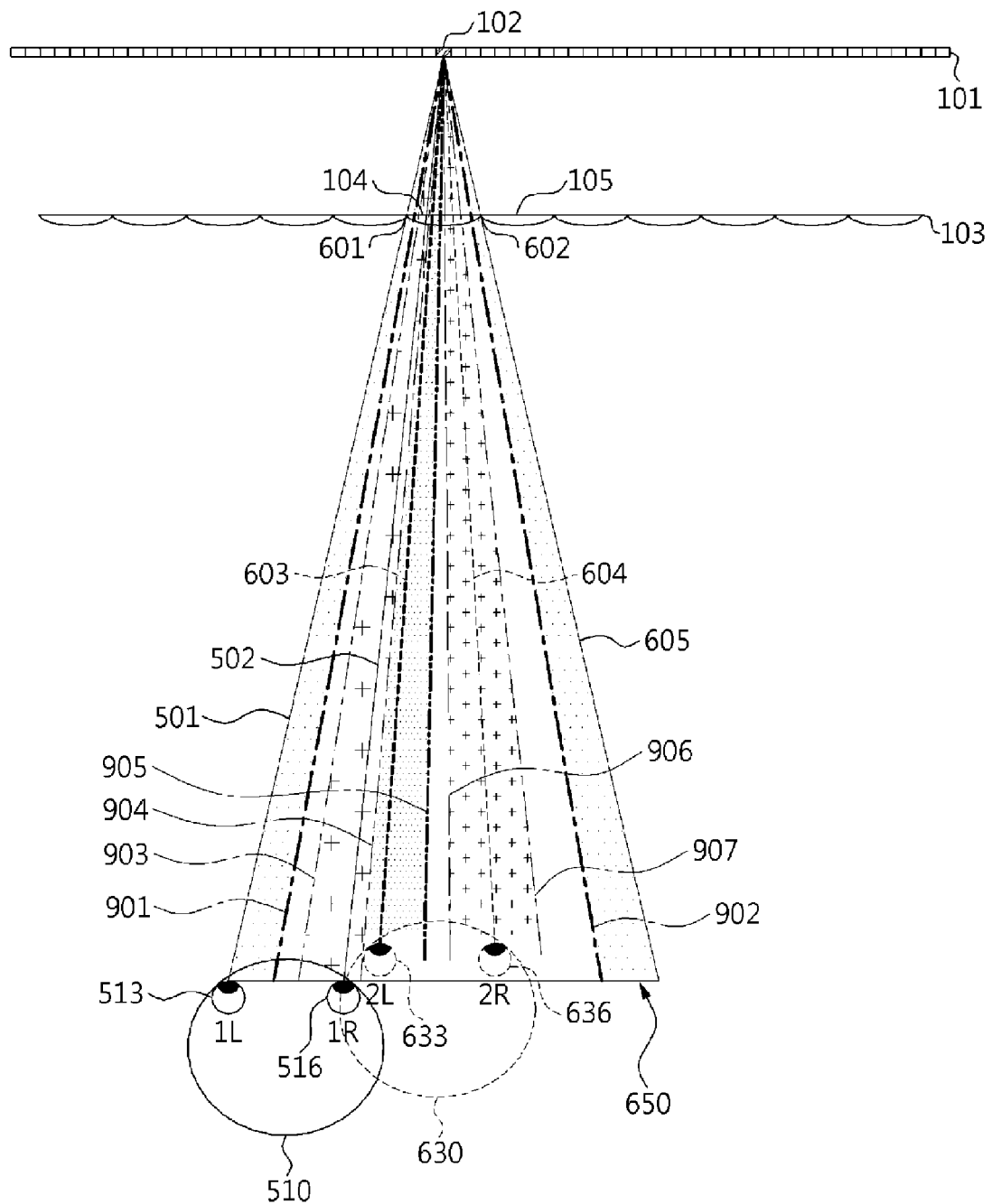

FIG. 9 illustrates another example of a process of a rendering apparatus that determines a ray direction range according to at least one example embodiment.

Hereinafter, a method of determining, by the rendering apparatus, a ray direction range by using an area having a certain size based on a direction toward each eye as a boundary will be described with reference to FIG. 9.

The rendering apparatus may determine a direction 901 separated by a certain distance further to the right based on the direction 501 toward the left eye 1L 513 of the first user 510 and may determine a direction 902 separated by a certain distance further to the left based on the direction 605 that is equivalent to the direction 501.

Here, when a ray direction from the subpixel 102 corresponds to an area between the directions 501 and 901 and an area between the directions 902 and 602, the subpixel 102 may represent an image viewed at the left eye 1L 513 of the first user 510 and the area between the directions 501 and 901 and the area between the directions 902 and 605 may be regarded as a ray direction range for the left eye 1L 513 of the first user 510.

Similarly, the rendering apparatus may determine a direction 903 separated by a certain distance further to the left based on the direction 502 toward the right eye 1R 516 of the first user 510, and may determine the direction 903 separated by the certain distance further to the left and a direction 904 separated by a certain size further to the right based on the direction 502.

It can be verified from FIG. 9 that a distance between the directions 903 and 502 differs from a distance between the directions 502 and 904. This is because a direction separated from the direction 502 further to the right by the distance between the directions 903 and 502 is positioned further to the right than a direction corresponding to the middle between the direction 502 toward the right direction 516 of the first user 510 and the direction 603 toward the left eye 2L 633 of the second user 630.

When a distance between two eyes is not secured by a desired (or alternatively, predetermined) size, the rendering apparatus may determine an intermediate direction between directions towards the both eyes as a boundary. Accordingly, the direction 904 may be represented as an intermediate direction between the directions 502 and 603.

Similarly, the rendering apparatus may determine directions 904 and 905 as boundaries of ray direction ranges for the left and the right based on the direction 603 toward the left eye 2L 633 of the second user 630, respectively. The rendering apparatus may determine directions 906 and 907 as boundaries of ray direction ranges for the left and the right based on the direction 604 toward the right eye 2R 636 of the second user 630, respectively.

If a ray direction range determined based on a direction toward an eye of each user is not sufficiently large in FIG. 9, a ray direction from the subpixel 102 may not be included in any ray direction range for eyes of users. In this case, light from the subpixel 102 may not be used to represent an image for an eye of any user.

Figure 10:
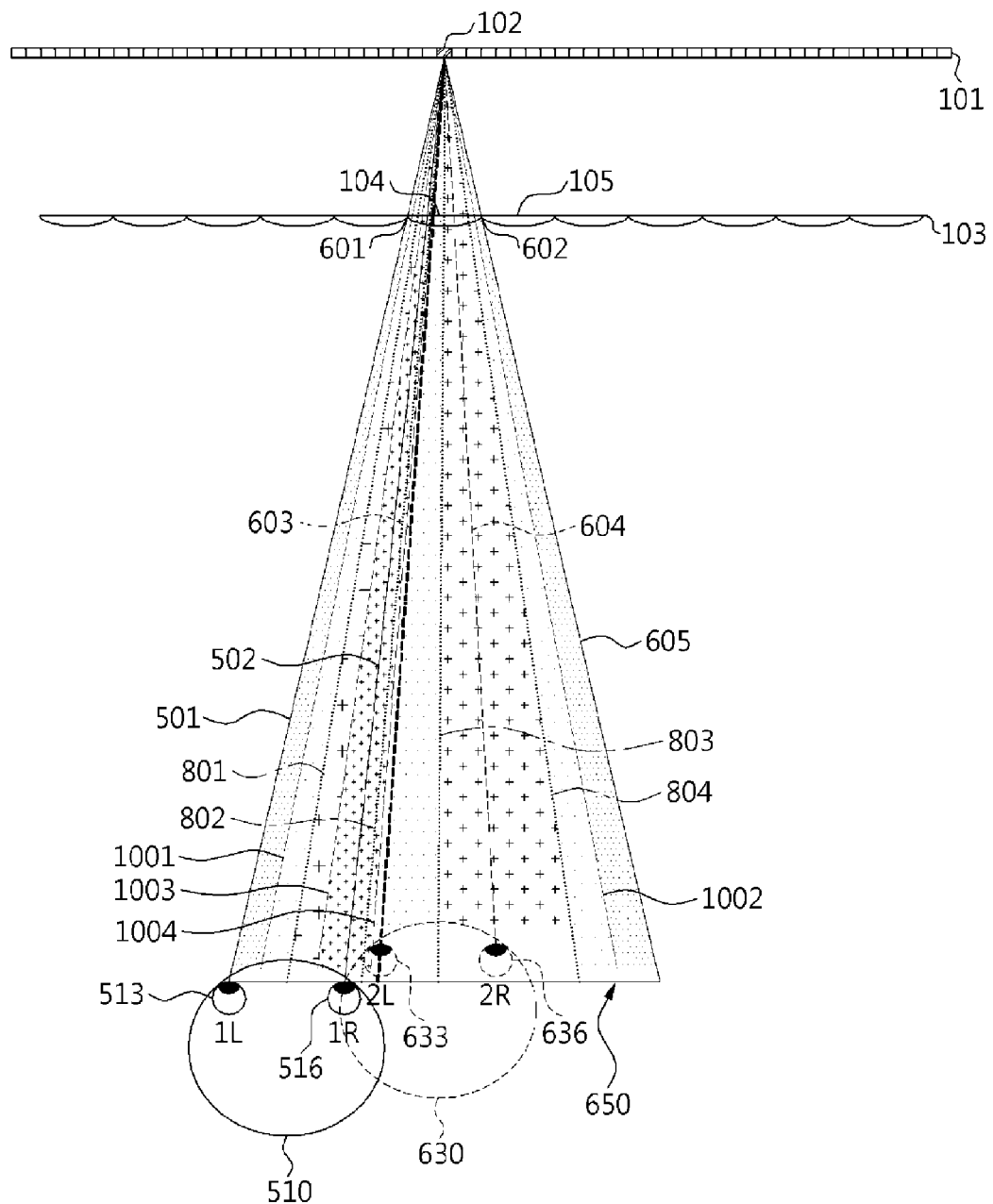

FIG. 10 illustrates still another example of a process of a rendering apparatus that determines a ray direction range according to at least one example embodiment. FIG. 10 illustrates an example in which the rendering apparatus modifies a determined ray direction range.

Although a ray direction range is already determined, modifications may be made to the determined ray direction range in terms of putting priority on a viewing environment of the first user 510.

The rendering apparatus may set an area between directions 501 and 1001 and an area between directions 1002 and 605 based on the left eye 1L 513 of the first user 510 as a minimum display area. Here, the minimum display area may be defined as an area within an allowable minimum separation distance. The allowable minimum separation distance refers to a minimum distance in which crosstalk of an allowable range occurs, and indicates a minimum distance in which when displaying different images on both sides based on a center between two positions, a desired (or alternatively, predefined) or less level of crosstalk occurs at both positions. In general, a crosstalk-free minimum distance may be set.

Here, the minimum display area, for example, the area between the directions 1002 and 605 is included in, for example, a ray direction range corresponding to the area between the directions 501 and 801 and the area between the directions 804 and 605 set in FIG. 8. Accordingly, the rendering apparatus may not modify the ray direction range.

In the same manner as above, the rendering apparatus may set an area between directions 1003 and 1004 based on the right eye 1R 516 of the first user 510 as the minimum display area. In this example, since a portion of the minimum display area, for example, the area between the directions 1003 and 1004 is deviated from, the ray direction range set in FIG. 8, the rendering apparatus may modify the ray direction range. Here, ray direction ranges for the right eye 1R 516 of the first user 510 and the left eye 1R 516 of the second user 630 may be modified.

The ray direction range for the right eye 1R 516 of the first user 510 may be expanded from an area between the directions 801 and 802 to an area between the directions 801 and 1004. The ray direction range for the left eye 2L 633 of the second user 630 may be reduced from an area between the directions 802 and 803 to an area between the directions 1004 and 803.

Figure 11:
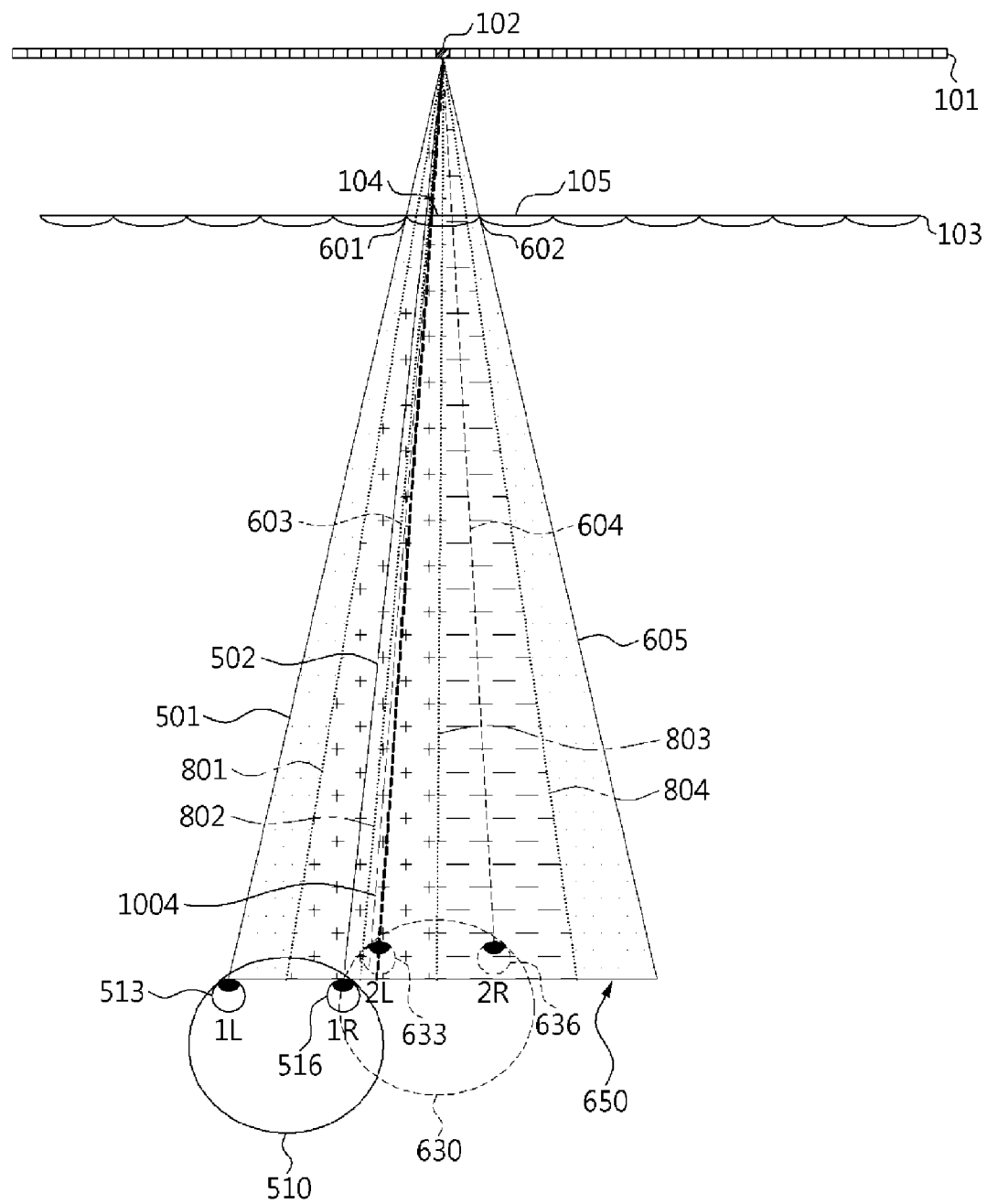
FIG. 11 illustrates a process of a light field rendering apparatus that determines contents for each sub-view area according to at least one example embodiment.

FIG. 11 illustrates an example of a process of a rendering apparatus that determines contents for each sub-view area according to at least one example embodiment.

The rendering apparatus may determine an image to be displayed in each ray direction range, based on ray direction range information determined through a ray direction range determining process. For example, the rendering apparatus may determine a desired (or alternatively, predefined) stereo image to be displayed in ray direction ranges for the left eye 1L 513 and the right eye 1R 516 of the first user 510. The rendering apparatus may represent an image for the second user 630 using remaining resources excluding subpixels required for the first user 510.

The rendering apparatus may determine an image to be displayed on both eyes, for example, the left eye 1L 513 and the right eye 1R 516, of the first user 510 and may determine an image to be displayed in ray direction ranges for the left eye 2L 633 and the right eye 2R 636 of the second user 630. To further efficiently use resources, the rendering apparatus enables the same contents as contents viewed at one eye of the first user 510 to be viewed at one or more of the left eye 2L 633 and the right eye 2R 636 of the second user 630.

The rendering apparatus may determine an image to be displayed in the ray direction ranges for the left eye 2L 633 and the right eye 2R 636 of the second user 630 based on, for example, a relationship between each ray direction range and directions from the subpixel 102 toward both eyes. A method of determining, by the rendering apparatus, an image to be displayed on both eyes of each user will be described with reference to FIGS. 12 to 15.

Figure 12A:
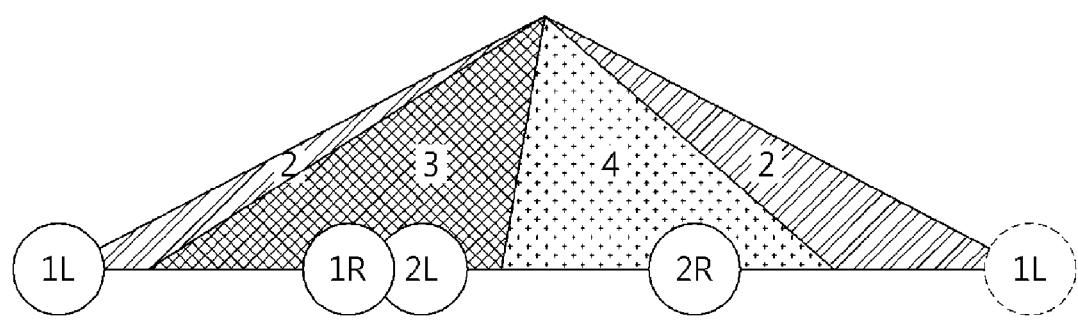
FIGS. 12A-12C illustrate a process of a light field rendering apparatus that determines contents for each sub-view area according to at least one example embodiment.
Figure 12B:
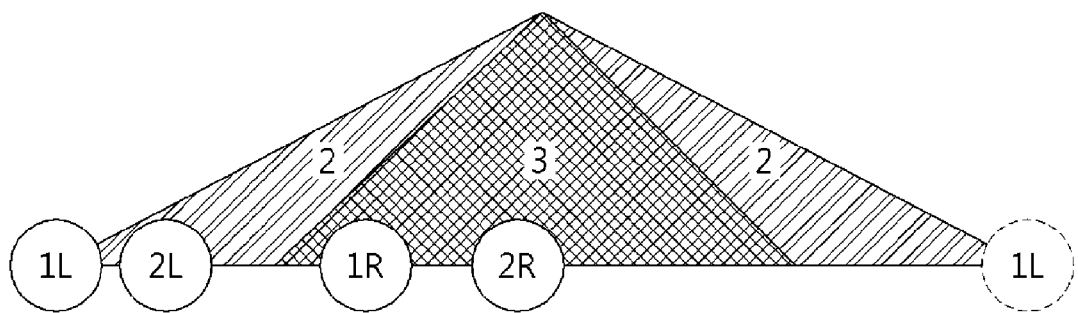
Figure 12C:
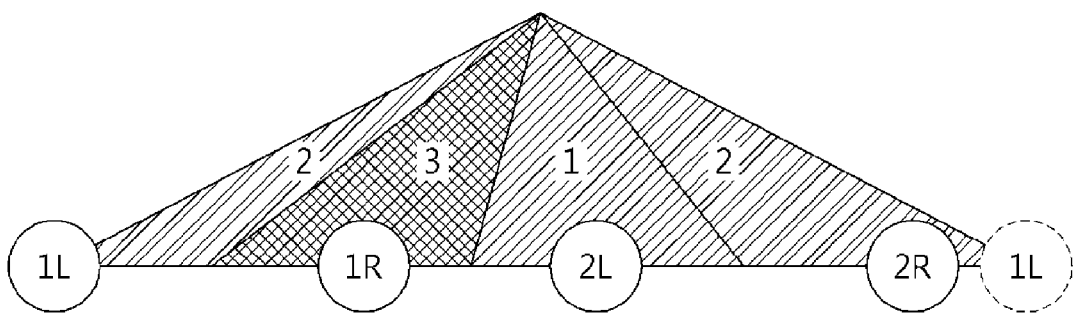

FIGS. 12A, 12B, and 12C illustrate another example of a process of a rendering apparatus that determines contents for each sub-view area according to at least one example embodiment.

FIGS. 12A, 12B, and 12C illustrate images, for example, contents displayed for the respective sub-view areas based on a positional relationship between both eyes of two users within a view cone.

Here, a single input image 1210 includes four view images, for example, a number 1 image, a number 2 image, a number 3 image, and a number 4 image. Here, the four view images are separated from each other at intervals of 1 IPD. When a user views images having adjacent numbers at a left eye and a right eye, the user may perceive a level of depth corresponding to a current general stereo image.

According to some example embodiments, a direction of a second user and direction areas of both eyes may be classified based on a view cone of a first user with respect to each subpixel. Also, a pair of the number 2 image and the number 3 image (an image of 2, 3 pair) may be provided to the first user at all times and an image corresponding to each following case may be provided to the second user.

An image of an area that includes a ray direction from a single subpixel in the view cone of FIGS. 12A, 12B, and 12C may be expressed as a value of the subpixel.

Hereinafter, an image to be displayed on an eye of each user based on a positional relationship between a left eye 1L and a right eye 1R of the first user and a left eye 2L and a right eye 2R of the second user within the view cone will be described.

FIG. 12A illustrates an example in which the second user views the number 3 image and the number 4 image, FIG. 12B illustrates an example in which the second user views the number 2 image and the number 3 image, and FIG. 12C illustrates an example in which the second user views the number 1 image and the number 2 image.

Referring to FIG. 12A, in an example in which the left eye 2L of the second user and the right eye 1R of the first user are close to each other or eyes are aligned in order of the left eye 1L of the first user, the right eye 1R of the first user, the left eye 2L of the second user, and the right eye 2R of the second user, and a distance between the right eye 1R of the first user and the left eye 2L of the second user is less than a distance between the right eye 2R of the second user and the left eye 1L of the first user, the rendering apparatus may display the number 2 image on the left eye 1L of the first user, may display the number 3 image on the right eye 1R of the first user and the left eye 2L of the second user, and may display the number 4 image on the right eye 2R of the second user. Here, '1L' indicated with dotted lines at the right end of the view cone may be regarded to be positioned at the same position as the left eye 1L of the first user that is positioned at the left end of the view cone.

Referring to FIG. 12B, in an example in which the left eye 1L of the first user and the left eye 2L of the second user are close within a sub-view area corresponding to the number 2 image and the right eye 1R of the first user and the right eye 2R of the second user are close within a sub-view area corresponding to the number 3 image, the rendering apparatus may display the number 2 image to be viewed at the left eye 1L of the first user and the left eye 2L of the second user and may display the number 3 image to be viewed at the right eye 1R of the first user and the right eye 2R of the second user. Here, each user may view a stereo image of 2, 3 pair.

Referring to FIG. 12C, in an example in which the left eye 1L of the first user and the right eye 2R of the second user are close within a sub-view area corresponding to the number 2 image and eyes are arranged in order of the left eye 1L of the first user, the right eye 1R of the first user, the left eye 2L of the second user, and the right eye 2R of the second user, the rendering apparatus may display the number 2 image on the left eye 1L of the first user and the right eye 2R of the second user, may display the number 3 image on the right eye 1R of the first user, and may display the number 1 image on the left eye 2L of the second user.

Hereinafter, various examples in which viewing distances are similar or dissimilar based on a position of an eye of each user in situations as shown in FIGS. 12A, 12B, and 12C will be described with reference to FIGS. 13A through 11I.

Referring to FIGS. 13A through 17I, an area of a view cone is expressed with a width of a rectangle, and a position of a horizontal direction is expressed as a single direction within the view cone. Further, a direction corresponding to an eye of a user within the view cone is expressed as a position of a horizontal direction. The rendering apparatus may draw a boundary at a center point between both eyes of each user positioned within the view cone, and may determine a view suitable for an area between boundaries.

In FIGS. 13A through 17I, a distance indicated with dotted lines is less than a distance indicated with a solid line and a distance indicated with alternative long and short lines may indicate a minimum separable distance.

According to a policy for determining contents or an image, since the number 2 image and the number 3 image are to be displayed on both eyes of the first user at all times, the rendering apparatus may determine the number 2 image for the left eye 1L of the first user and may determine the number 3 image for the right eye 1R of the first user. Also, the rendering apparatus may determine an image of each sub-view area so that the second user may also view a 3D image.

FIGS. 13A-13G illustrate examples of a process of a rendering apparatus that determines an image for each sub-view area according to at least one example embodiment.

FIGS. 13A-13G illustrate various examples in which the rendering apparatus determines an image based on positions of eyes of users in the same situation as FIG. 12A.

Hereinafter, a case in which viewing distances are similar will be described.

Figure 13A:
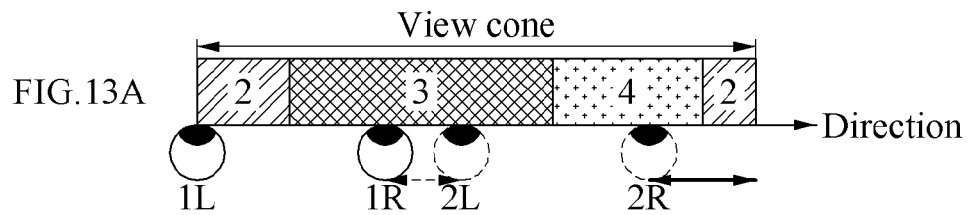
FIGS. 13A-13G illustrates various examples in which the rendering apparatus determines an image based on positions of eyes of users in the same situation as FIG. 12A.
Figure 13B:
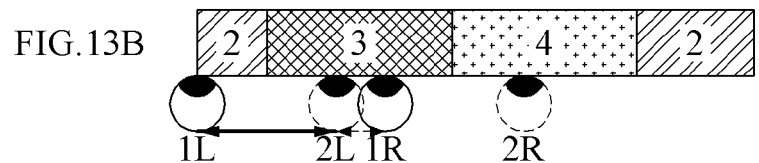

FIGS. 13A and 13B illustrate examples in which viewing distances of a first user and a second user are similar and distances between both eye directions of the first user and the second user are similar within a view cone.

Referring to FIG. 13A, a right end of the view cone may be regarded to be at the same position as the left eye 1L of the first user that is positioned at a left end of the view cone based on an iterative characteristic of a view cone area.

The rendering apparatus may select or determine images of sub-view areas based on, for example, a relatively close distance between a distance between the left eye 1L of the first user and the right eye 2R of the second user and a distance between the right eye 1R of the first user and the left eye 2L of the second user.

Referring to FIG. 13A, since the distance between the right eye 1R of the first user and the left eye 2L of the second user is less than the distance between the left eye 1L of the first user and the right eye 2R of the second user, the rendering apparatus may determine the number 3 image for the left eye 2L of the second user and the number 4 image for the right eye 2R of the second user. The second user may view a 3D image of 3, 4 pair.

FIG. 13B illustrates an example in which the left eye 2L of the second user has moved to be between both eyes of the first user and is positioned to be relatively close to the right eye 1R of the first user. In this example, similar FIG. 13A, the rendering apparatus may determine the number 3 image for the left eye 2L of the second user and the number 4 image for the right eye 2R of the second user. The second user may view a 3D image of 3, 4 pair.

Hereinafter, a case in which viewing distances are dissimilar will be described.

Dissimilar to the aforementioned case in which viewing distances are similar, there is no guarantee that two users view an image in similar viewing distances at all times. Thus, a method of selecting or determining, by the rendering apparatus, an image when viewing distances are dissimilar is required. A method of determining, by the rendering apparatus, an image for a second user in various cases in which viewing distances of two users are dissimilar will be described.

Figure 13C:
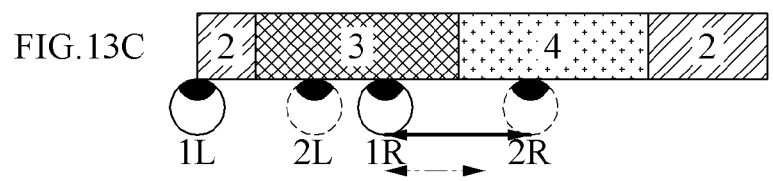
Figure 13D:
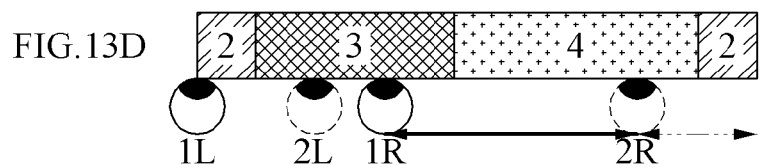

FIGS. 13C and 13D illustrate examples in which the left eye 2L of the second user is positioned between both eyes of the first user and the left eye 2L of the second user is closer to the right eye 1R of the first user than the left eye 1R of the first user. Here, FIG. 13C illustrates an example in which the right eye 2R of the second user is positioned further to the right than the right eye 1R of the first user, and a distance between the right eye 2R of the second user and the right eye 1R of the first user is greater than a minimum separable distance indicated with alternate long and short lines, and FIG. 13D illustrates an example in which a distance between the right eye 2R of the second user and the left eye 1L of the first user is also greater than the minimum separable distance.

In FIGS. 13C and 13D, the rendering apparatus may determine the number 3 image for the left eye 2L of the second user and the number 4 image for the right eye 2R of the second user. The second user may view a 3D image of 3, 4 pair.

Figure 13E:
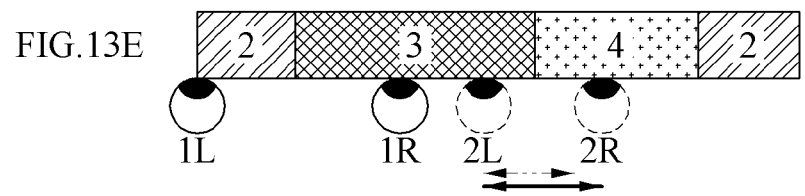
Figure 13F:
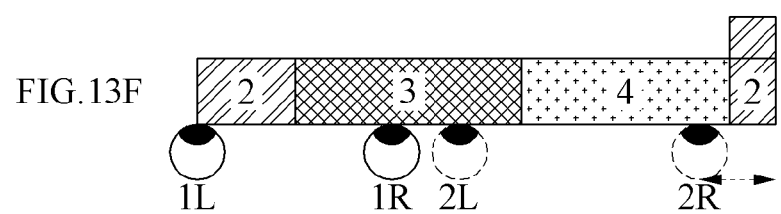

FIG. 13E illustrates an example in which the left eye 2L of the second user is positioned further to the right than the right eye 1R of the first user and a distance between the left eye 2L of the second user and the right eye 1R of the first user is less than a minimum separable distance. Further, FIG. 13F illustrates an example in which the right eye 2R of the second user is positioned further to the right than the left eye 2L of the second user and a distance between the left eye 1L of the first eye and the right eye 2R of the second user is greater than the minimum separable distance. In FIGS. 13E and 13F, the rendering apparatus may display the number 3 image on the left eye 2L of the second user and display the number 4 image on the right eye 2R of the second user. When the distance between the right eye 2R of the second user and the left eye 1L of the first user is within the minimum separable distance in FIG. 13F, the rendering apparatus guarantees a viewing environment of the first user and thus, crosstalk may occur on the right eye 2R of the second user.

Figure 13G:
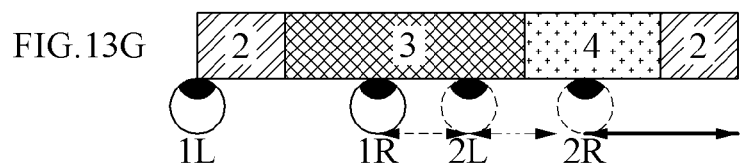

FIG. 13G illustrates an example in which the left eye 2L of the second user is positioned further to the right than the right eye 1R of the first user, and a distance between the left eye 2L of the second user and the right eye 1R of the first user is greater than the minimum separable distance. Here, it is assumed that a distance between the right eye 2R and the left eye 2L of the second user is greater than the minimum separable distance and a distance between the right eye 1R of the first user and the right eye 2R of the second user is less than a distance between the right eye 2R of the second user and the left eye 1L of the first user.

In this example, the rendering apparatus may determine the same number 3 image as one for the right eye 1R of the first user for the left eye 2L of the second user and may determine the number 4 image for the right eye 2R of the second user so that the second user may view a 3D image. The second user may view a 3D image of 3, 4 pair.

FIGS. 14A-16J illustrate examples of a process of a rendering apparatus that determines an image for each sub-view area according to at least one example embodiment.

FIGS. 14A-16J illustrate various examples in which the rendering apparatus determines an image based on positions of eyes of users in the same situation as FIG. 12B.

Hereinafter, a case in which viewing distances are similar will be described.

Figure 14A:
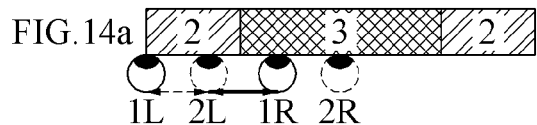
FIGS. 14A-14M illustrate various examples in which the rendering apparatus determines an image based on positions of eyes of users in the same situation as FIG. 12B.

FIG. 14A illustrates an example in which the left eye 2L of the second user is positioned between the left eye 1L and a right eye 1R of the first user and the left eye 2L of the second user is closer to the left eye 1L of the first user than the right eye 1R of the first user. In this example, since the left eye 2L of the second user is adjacent to the left eye 1L of the first user, the rendering apparatus may determine the same number 2 image as one for the left eye 1L of the first user for the left eye 2L of the second user. Also, the rendering apparatus may determine the number 3 image for the right eye 2R of the second user so that the second user may smoothly view a 3D image. In this example, all of the first user and the second user may view the number 2 image and the number 3 image.

Figure 14J:
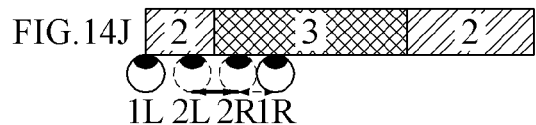
Figure 14B:
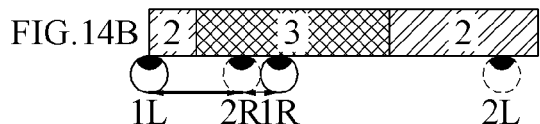

FIG. 14B illustrates an example in which the right eye 2R of the second user is positioned between both eyes of the first user and is positioned closer to the right eye 1R of the first user than the left eye 1L of the first user. In this example, since the right eye 2R of the second user is adjacent to the right eye 1R of the first user, the rendering apparatus may determine the same number 3 image as one for the right eye 1R of the first user for the right eye 2R of the second user. The rendering apparatus may determine the same number 2 image as one for the left eye 1L of the first user for the left eye 2L of the second user.

Hereinafter, a case in which viewing distances are dissimilar will be described.

FIG. 14C-14H illustrate examples of a process of the rendering apparatus that determines an image of a position of the right eye 2R of the second user when a distance between the left eye 2L of the second user and the left eye 1L of the first user is within a minimum distance for image separation and display.

Figure 14K:
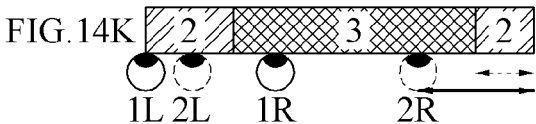
Figure 14C:
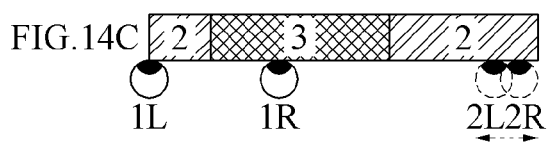

FIG. 14C illustrates an example in which the right eye 2R of the second user is positioned between the left eye 2L of the second user and the left eye 1L of the first user. The rendering apparatus may display the same image on eyes of users that are present in a minimum distance in which a separation and display is possible. The rendering apparatus may determine the same number 2 image for all of the left eye 2L and the right eye 2R of the second user. The second user may view the number 2 image in a 2D form.

Figure 14L:
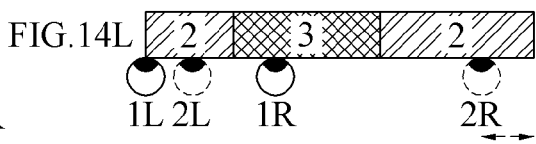
Figure 14D:
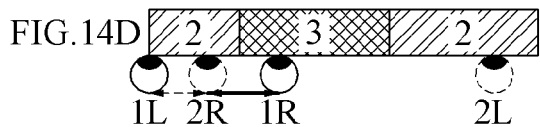

FIG. 14D illustrates an example in which the right eye 2R of the second user is positioned between the left eye 1L and the right eye 1R of the first user and is positioned closer to the left eye 1L of the first user than the right eye 1R of the first user. In this example, since both eyes, that is, the left eye 2L and the right eye 2R, of the second user are close to the left eye 1L of the first user, the rendering apparatus may determine the number 2 image for all of the left eye 2L and the right eye 2R of the second user.

Figure 14M:
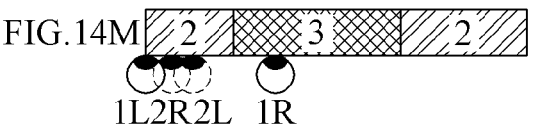
Figure 14E:
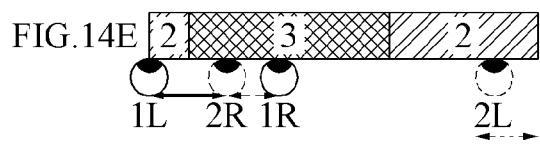

FIG. 14E illustrates an example in which the right eye 2R of the second user is positioned between the left eye 1L and the right eye 1R of the first user, and is closer to the right eye 1R of the first user than the left eye 1L of the first user. In this example, the left eye 2L of the second user is closer to the left eye 1L of the first user and the right eye 2R of the second user is closer to the right eye 1R of the first user. Thus, the rendering apparatus may determine the number 2 image for the left eye 2L of the second user and the number 3 image for the right eye 2R of the second user. The second user may view a 3D image of 2, 3 pair.

Figure 14F:
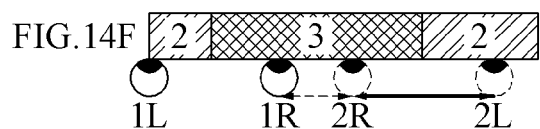

FIG. 14F illustrates an example in which the right eye 2R of the second user is positioned between the right eye 1R of the first user and the left eye 2L of the second user, and is closer to the right eye 1R of the first user than the left eye 2L of the second user. In this example, the rendering apparatus may determine the number 2 image for the left eye 2L of the second user and may determine the number 3 image for the right eye 2R of the second user. The second user may view the same 3D image of 2, 3 pair as one viewed by the first user.

Figure 14G:
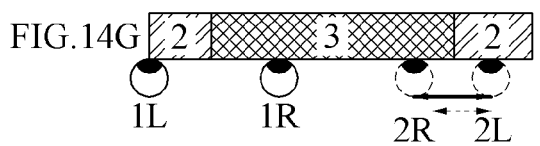

FIG. 14G illustrates an example in which the right eye 2R of the second user is positioned between the right eye 1R of the first user and the left eye 2L of the second user. Here, although the right eye 2R of the second user is closer to the left eye 2L of the second user than the right eye 1R of the first user, a distance between the right eye 2R and the left eye 2L of the second user is greater than a minimum distance for image separation and display. In this example, since separation and display for both eyes, the left eye 2L and the right eye 2R, of the second user is possible, the rendering apparatus may determine the number 2 image for the left eye 2L of the second user and may determine the number 3 image for the right eye 2R of the second user. The second user may view the same 3D image of 2, 3 pair as one viewed by the first user.

Figure 14H:
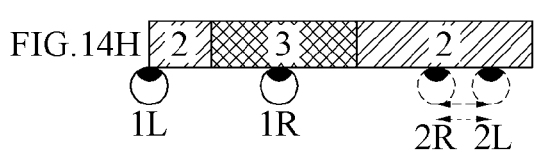

FIG. 14H illustrates an example in which the right eye 2R of the second user is positioned between the right eye 1R of the first user and the left eye 2L of the second user and is closer to the left eye 2L of the second than the right eye 1R of the first user, and a distance between the left eye 2L and the right eye 2R of the second user is less than a minimum distance for separation and display. In this example, since separation and display for both eyes, the left eye 2L and the right eye 2R, of the second user is impossible, the rendering apparatus may display an image in which artifact is minimized by determining the same image for both eyes of the second user. The rendering apparatus may determine the number 2 image for all of the left eye 2L and the right eye 2R of the second user. The second user may view the number 2 image in a 2D form.

FIG. 14I-M illustrate examples in which the rendering apparatus determines an image based on a position of the right eye 2R of the second user when the left eye 2L of the second user is positioned between the left eye 1L and the right eye 1R of the first user and is closer to the left eye 1L of the first user than the right eye 1R of the first user.

Figure 14I:
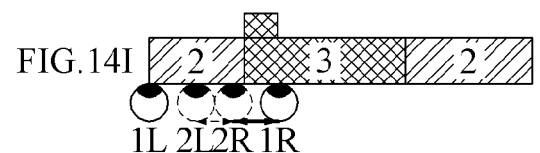

FIG. 14I illustrates an example in which the right eye 2R of the second user is positioned between the left eye 2L of the second user and the right eye 1R of the first user and is closer to the left eye 2L of the second user than the right eye 1R of the first user. In this example, since the left eye 2L of the second user is closer to the left eye 1L of the first user, the rendering apparatus may determine the number 2 image for the left eye 2L of the second user. Also, since the right eye 2R of the second user is closer to the left eye 2L of the second user, the rendering apparatus may determine the number 2 image for the right eye 2R of the second user.

Here, when a distance between the right eye 2R of the second user and the right eye 1R of the first user is less than a minimum separable distance in FIG. 14I, the rendering apparatus determines a display range within the view cone for the right eye 1R of the first user. Accordingly, a boundary between the number 2 image and the number 3 image is leaned to one side between the right eye 1R of the first user and the right eye 2R of the second user, instead of being positioned in the middle therebetween. Here, a width of a rectangle protruded from a bar that indicates a size of the view cone indicates a minimum range to be secured to the left from the center of the right eye 1R of the first user.

FIG. 14J illustrates an example in which the right eye 2R of the second user is positioned between the left eye 2L of the second user and the right eye 1R of the first user and is closer to the right eye 1R of the first user than the left eye 2L of the second user. In this example, the rendering apparatus enables the second user to view the same 3D image of 2, 3 pair as one viewed by the first user. When a distance between the left eye 2L and the right eye 2R of the second user is less than the minimum separable distance, the second user may view a 3D image that includes a certain amount of crosstalk.

FIG. 14K illustrates an example in which the right eye 2R of the second user is positioned further to the right than the right eye 1R of the first user and a distance between the right eye 2R of the second user and the left eye 1L of the first user is greater than the minimum separable distance. In this example, the rendering apparatus enables the second user to view the same 3D image of 2, 3 pair as one viewed by the first user.

FIG. 14L illustrates an example in which the right eye 2R of the second user is positioned further to the right than the right eye 1R of the first user and a distance between the right eye 2R of the second user and the left eye 1L of the first user is less than the minimum separable distance. In this example, the rendering apparatus may determine the number 2 image for both eyes, the left eye 2L and the right eye 2R, of the second user.

FIG. 14M illustrates an example in which the right eye 2R of the second user is positioned between the left eye 1L of the first user and the left eye 2L of the second user. In this example, the rendering apparatus may determine the number 2 image for both eyes, the left eye 2L and the right eye 2R, of the second user.

A process of the rendering apparatus that determines an image based on a position of the right eye 2R of the second user when the left eye 2L of the second user is positioned between the left eye 1L and the right eye 1R of the first user and is closer to the right eye 1R of the first user than the left eye 1L of the first user will be described with reference to FIGS. 15A-15D.

Figure 15A:
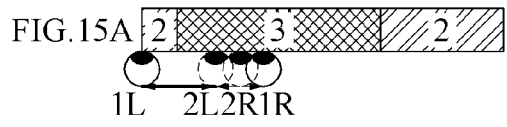
FIGS. 15A-15K illustrate various examples in which the rendering apparatus determines an image based on positions of eyes of users in the same situation as FIG. 12B.

FIG. 15A illustrates an example in which the right eye 2R of the second user is positioned between the left eye 1L and the right eye 1R of the first user and is closer to the right eye 1R of the first user than the left eye 1L of the first user. In this example, the rendering apparatus may determine the number 3 image for both eyes, the left eye 2L and the right eye 2R, of the second user.

Figure 15B:
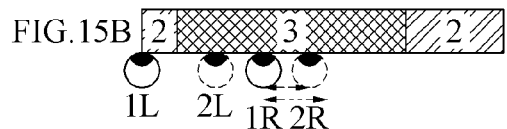

FIG. 15B illustrates an example in which the right eye 2R of the second user is positioned further to the right than the right eye 1R of the first user and a distance between the right eye 2R of the second user and the right eye 1R of the first user is less than the minimum separable distance. In this example, the rendering apparatus may determine the number 3 image for both eyes, the left eye 2L and the right eye 2R, of the second user.

Figure 15C:
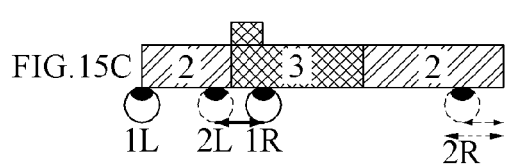

FIG. 15C illustrates an example in which the right eye 2R of the second user is positioned further to the right than the right eye 1R of the first user and a distance between the right eye 2R of the second user and the left eye 1L of the first user is less than the minimum separable distance. In this example, the same number 2 image as one for the left eye 1L of the first user is to be displayed on the right eye 2R of the second user. The rendering apparatus may determine the number 2 image for the left eye 2L of the second user so that a 2D image may be viewed at both eyes of the second user. Here, when a distance between the left eye 2L of the second user and the right eye 1R of the first user is less than the minimum separable distance, crosstalk may occur on the left eye 2L of the second user since the rendering apparatus desires to guarantee a viewing environment for the right eye 1R of the first user.

Figure 15D:
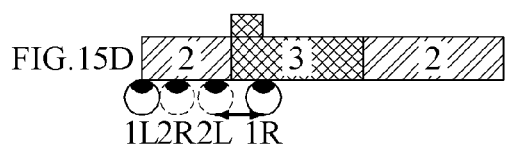

FIG. 15D illustrates an example in which the right eye 2R of the second user is positioned between the left eye 1L of the first user and the left eye 2L of the second user. In this example, the rendering apparatus may determine an image so that the number 2 image may be viewed at both eyes of the second user. Here, similar to FIG. 15C, when a distance between the left eye 2L of the second user and the right eye 1R of the first user is less than the minimum separable distance, crosstalk may occur on the left eye 2L of the second user.

Hereinafter, a process of the rendering apparatus that determines an image based on a position of the right eye 2R of the second user when the left eye 2L of the second user is positioned further to the right than the right eye 1R of the first user and a distance between the right eye 1R of the first user and the left eye 2L of the second user is less than the minimum separable distance will be described with reference to FIGS. 15E-15H.

Figure 15E:
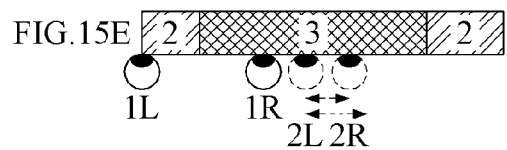

FIG. 15E illustrates an example in which the right eye 2R of the second user is positioned further to the right than the left eye 2L of the second user and a distance between the right eye 2R and the left eye 2L of the second user is less than the minimum separable distance. In this example, the rendering apparatus may determine the number 3 image for both eyes, the left eye 2L and the right eye 2R, of the second user. The second user may view the number 3 image in a 2D form.

Figure 15F:
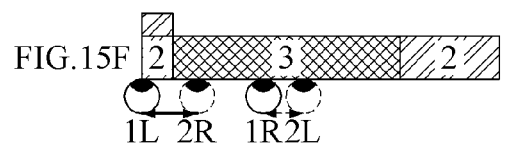
Figure 15G:
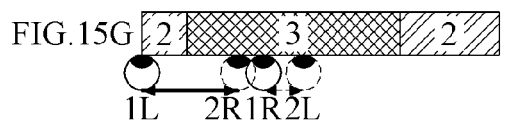

FIGS. 15F and 15G illustrate examples in which the right eye 2R of the second user is positioned between the left eye 1L and the right eye 1R of the first user. In the examples, the rendering apparatus may determine the same number 3 image for the left eye 2L of the second user and the right eye 1R of the first user, and may not determine the number 2 image for the right eye 2R of the second user and thus, may determine the number 3 image for the right eye 2R of the second user. Here, the rendering apparatus desires to guarantee a viewing environment of the first user. Thus, when a distance between the left eye 1L of the first user and the right eye 2R of the second user is less than the minimum separable distance, crosstalk may occur on the right eye 2R of the second user in FIG. 15F.

Figure 15H:
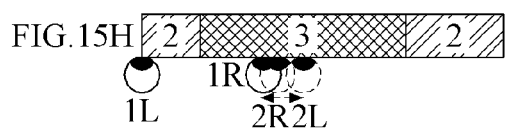

FIG. 15H illustrates an example in which the right eye 2R of the second user is positioned between the right eye 1R of the first user and the left eye 2L of the second user. In this example, the rendering apparatus may determine the same number 3 image for the left eye 2L and the right eye 2R of the second user. The second user may view the number 3 image in a 2D form.

Hereinafter, a process of the rendering apparatus that determines an image based on a position of the right eye 2R of the second user when the left eye 2L of the second user is positioned further to the right than the right eye 1R of the first user and a distance between the right eye 1R of the first user and the left eye 2L of the second user is greater than the minimum separable distance will be described with reference to FIGS. 15I-15K.

Figure 15I:
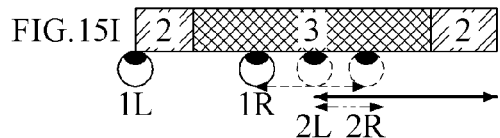

FIG. 15I illustrates an example in which a distance between the right eye 2R and the left eye 2L of the second user is less than the minimum separable distance. In this example, the rendering apparatus may compare a distance between the left eye 2L of the second user and the left eye 1L of the first user and a distance between the right eye 1R of the first user and the right eye 2R of the second user and may determine an image corresponding to a relatively short distance for the right eye 2R of the second user. Here, the distance between the right eye 1R of the first user and the right eye 2R of the second user is less than the distance between the left eye 2L of the second user and the left eye 1L of the first user. Thus, the rendering apparatus may determine the number 3 image, which is determined for the right eye 1R of the first user, for both eyes of the second user. The second user may view the number 3 image in a 2D form.

Figure 15J:
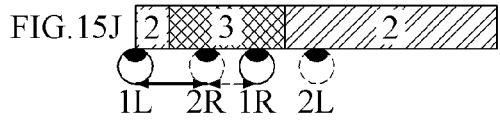

FIG. 15J illustrates an example in which the right eye 2R of the second user is positioned between the left eye 1L and the right eye 1R of the first user and a distance between the right eye 2R of the second user and the left eye 1L of the first user is greater than a distance between the right eye 2R of the second user and the right eye 1R of the first user. In this example, the rendering apparatus may determine the number 3 image corresponding to the right eye 1R of the first user for the right eye 2R of the second user and may determine the number 2 image for the left eye 2L of the second user for 3D display. The second user may view the same 3D image of 2, 3 pair as one viewed by the first user.

Figure 15K:
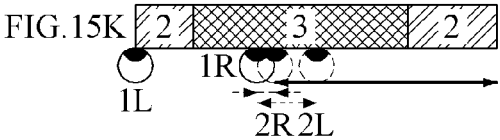

FIG. 15K illustrates an example in which the right eye 2R of the second user is positioned between the right eye 1R of the first user and the left eye 2L of the second user. Here, since a distance between the right eye 1R of the first user and the right eye 2R of the second user is less than a distance between the right eye 2R of the second user and the left eye 1L of the first user, the rendering apparatus may determine the same number 3 image as one for the right eye 1R of the first user for the right eye 2R of the second user. When a distance between the right eye 2R and the left eye 2L of the second user is greater than the minimum separable distance, the rendering apparatus may determine the number 2 image for the left eye 2L of the second user for 3D display.

In FIG. 15K, since a distance between the right eye 2R and the left eye 2L of the second user is less than the minimum separable distance, the rendering apparatus may determine the number 3 image for the left eye 2L of the second user. The second user may view the number 3 image in a 2D form.

Hereinafter, a process of the rendering apparatus that determines an image based on a position of the right eye 2R of the second user when the left eye 2L of the second user is positioned further to the right than the right eye 1R of the first user, a distance between the left eye 2L of the second user and the left eye 1L of the first user is less than a distance between the left eye 2L of the second user and the right eye 1R of the first user, and the distance between the left eye 2L of the second user and the left eye 1L of the first user is greater than the minimum separable distance will be described with reference to FIGS. 16A-16D.

FIG. 16A illustrates an example in which the right eye 2R of the second user is positioned between the left eye 2L of the second user and the left eye 1L of the first user and a distance between the left eye 2L and the right eye 2R of the second user is less than the minimum separable distance.

In this example, since the left eye 2L of the second user is closer to the left eye 1L of the first user, the rendering apparatus may determine the same number 2 image as one for the left eye 1L of the first user for the left eye 2L of the second user. Also, the rendering apparatus may determine the same number 2 image for the right eye 2R of the second user having a distance from the left eye 2L of the second user less than the minimum separable distance. The second user may view the number 2 image in a 2D form.

FIG. 16B illustrates an example in which the right eye 2R of the second user is positioned between the left eye 1L and the right eye 1R of the first user, and a distance between the right eye 2R of the second user and the left eye 1L of the first user is greater than the right eye 2R of the second user and the right eye 1R of the first user. In this example, the rendering apparatus may determine the same number 3 image as one for the right eye 1R of the first user for the right eye 2R of the second user and may determine the number 2 image for the left eye 2L of the second user. The second user may view a 3D image of 2, 3 pair.

FIG. 16C illustrates an example in which the right eye 2R of the second user is positioned between the right eye 1R of the first user and the left eye 2L of the second user and a distance between the right eye 2R of the second user and the right eye 1R of the first user is less than a distance between the right eye 2R and the left eye 2L of the second user. In this example, the rendering apparatus may determine the same number 3 image as one for the right eye 1R of the first user for the right eye 2R of the second user and may determine the number 2 image for the left eye 2L of the second user. The second user may view a 3D image of 2, 3 pair.

FIG. 16D illustrates an example in which the right eye 2R of the second user is positioned between the right eye 1R of the first user and the left eye 2L of the second user and a distance between the right eye 2R and the left eye 2L of the second user is less than the minimum separable distance. In this example, the rendering apparatus may determine the number 2 image for both eyes, the left eye 2L and the right eye 2R, of the second user. The second user may view the number 2 image in a 2D form.

Hereinafter, a process of the rendering apparatus that determines an image based on a position of the right eye 2R of the second user when the left eye 2L of the second user is positioned further to the right than the right eye 1R of the first user and a distance between the left eye 1L of the first user and the left eye 2L of the second user is less than the minimum separable distance will be described with reference to FIGS. 16E-16J.

FIG. 16E illustrates an example in which the right eye 2R of the second user is positioned between the left eye 2L of the second user and the left eye 1L of the first user. In this example, the rendering apparatus may determine the number 2 image for both eyes, the left eye 2L and the right eye 2R, of the second user. The second user may view the number 2 image in a 2D form.

FIG. 16F illustrates an example in which the right eye 2R of the second user is positioned between the left eye 1L and the right eye 1R of the first user, and a distance between the right eye 2R of the second user and the left eye 1L of the first user is less than a distance between the right eye 2R of the second user and the right eye 1R of the first user. In this example, since both eyes of the second user are closer to the left eye 1L of the first user than the right eye 1R of the first user, the rendering apparatus may determine the number 2 image for both eyes, the left eye 2L and the right eye 2R, of the second user. The second user may view the number 2 image in a 2D form.

FIG. 16G illustrates an example in which the right eye 2R of the second user is positioned between the left eye 1L and the right eye 1R of the first user and a distance between the right eye 2R of the second user and the left eye 1L of the first user is greater than a distance between the right eye 2R of the second user and the right eye 1R of the first user. In this example, since the right eye 2R of the second user is closer to the right eye 1R of the first user, the rendering apparatus may determine the number 3 image for the right eye 2R of the second user. Also, since the left eye 2L of the second user is closer to the left eye 1L of the first user, the rendering apparatus may determine the number 2 image for the left eye 2L of the second user. The second user may view the same 3D image of 2, 3 pair as one viewed by the first user.

FIG. 16H illustrates an example in which the right eye 2R of the second user is positioned between the right eye 1R of the first user and the left eye 2L of the second user and a distance between the right eye 2R of the second user and the right eye 1R of the first user is less than a distance between the right eye 2R of the second user and the left eye 2L of the second user. In this example, the rendering apparatus may determine the same number 3 image as one for the right eye 1R of the first user for the right eye 2R of the second user and may determine the same number 2 image as one for the left eye 1L of the first user for the left eye 2L of the second user. The second user may view the same 3D image of 2, 3 pair as one viewed by the first user.

FIG. 16I illustrates an example in which the right eye 2R of the second user is positioned between the right eye 1R of the first user and the left eye 2L of the second user and a distance between the right eye 2R of the second user and the left eye 2L of the second user is less than a distance between the right eye 2R of the second user and the right eye 1R of the first user and is greater than the minimum separable distance. In this example, the rendering apparatus may determine the same number 3 image as one for the right eye 1R of the first user for the right eye 2R of the second user and may determine the same number 2 image as one for the left eye 1L of the first user for the left eye 2L of the second user. The second user may view the same 3D image of 2, 3 pair as one viewed by the first user.

FIG. 16J illustrates an example in which the right eye 2R of the second user is positioned between the right eye 1R of the first user and the left eye 2L of the second user and a distance between the right eye 2R and the left eye 2L of the second user is less than the minimum separable distance. In this example, the rendering apparatus may determine the same number 2 image as one for the left eye 1L of the first user for both eyes, the left eye 2L and the right eye 2R, of the second user. The second user may view the number 2 image in a 2D form.

FIGS. 17A-17I illustrate examples of a process of a rendering apparatus that determines an image for each sub-view area according to at least one example embodiment.

FIGS. 17A-17I illustrate various examples in which the rendering apparatus determines an image based on positions of eyes of users in the same situation as FIG. 12C.

Hereinafter, cases that may occur when viewing distances of the first user and the second user are similar and distances between both eye directions of two users are similar within a view cone will be described with reference to FIGS. 17A and 17B.

Initially, a case in which viewing distances are similar will be described.

Figure 17A:
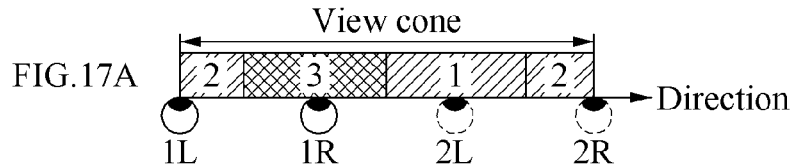
FIGS. 17A-17I illustrates various examples in which the rendering apparatus determines an image based on positions of eyes of users in the same situation as FIG. 12C.

FIG. 17A illustrates an example in which the right eye 2R of the second user is positioned at a right end of the view cone and is regarded to be at the same position as the left eye 1L of the first user that is positioned at a left end of the view cone. In this example, the rendering apparatus may determine number 2 and number 3 images to be viewed at both eyes of the first user. The rendering apparatus may determine the same number 2 image as one for the left eye 1L of the first user for the right eye 2R of the second user.

The rendering apparatus is to determine an image to be displayed for the left eye 2L of the second user. Here, when the rendering apparatus determines the number 1 image for the left eye 2L of the second user, the second user may view a 3D image of 1, 2 pair. When the rendering apparatus determines the number 2 image for the left eye 2L of the second user, the second user may view the number 2 image in a 2D form.

Figure 17B:
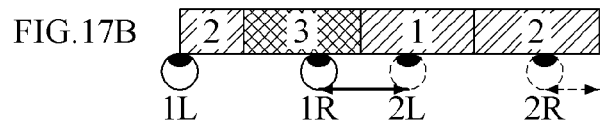

FIG. 17B illustrates an example in which a distance between the right eye 2R of the second user and the left eye 1L of the first user is less than the right eye 1R of the first user and the left eye 2L of the second user. The rendering apparatus may determine the number 2 image for the right eye 2R of the second user and may determine the number 1 image for the left eye 2L of the second user.

Figure 17C:
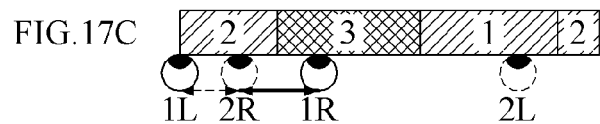

FIG. 17C illustrates an example in which the right eye 2R of the second user is positioned between the left eye 1L and the right eye 1R of the first user and is closer to the left eye 1L of the first user than the right eye 1R of the first user. In this example, the rendering apparatus may determine the same number 2 image as one for the left eye 1L of the first user for the right eye 2R of the second user. The rendering apparatus may determine the number 1 image for the left eye 2L of the second user. The second user may view a 3D image of 1, 2 pair.

Hereinafter, a case in which viewing distances are dissimilar will be described.

Hereinafter, a process of the rendering apparatus that determines an image based on a position of the right eye 2R of the second user when the left eye 2L of the second user is positioned further to the right than the right eye 1R of the first user and a distance between the right eye 1R of the first user and the left eye 2L of the second user is less than the minimum separable distance will be described with reference to FIGS. 17D and 17E.

Figure 17D:
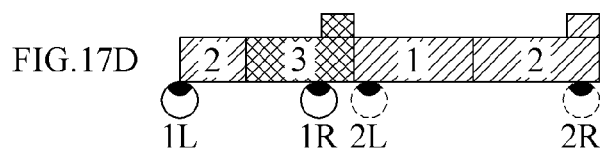

FIG. 17D illustrates an example in which the right eye 2R of the second user is positioned further to the left than the left eye 1L of the first user and a distance between the right eye 2R of the second user and the left eye 1L of the first user is less than the minimum separable distance and is less than a distance between the left eye 2L of the second user and the right eye 1R of the first user. In this example, since the same number 2 image as one for the left eye 1L of the first user is to be displayed on the right eye 2R of the second user, the rendering apparatus may determine the number 1 image for the left eye 2L of the second user. Since a viewing environment of the first user is to be guaranteed, crosstalk may occur on the left eye 2L of the second user.

Figure 17E:
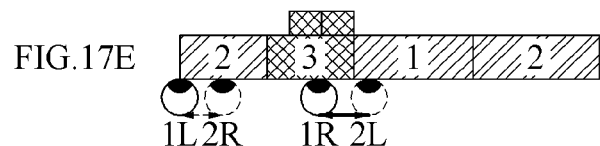

FIG. 17E illustrates an example in which the right eye 2R is positioned further to the right than the left eye 1L of the first user, and a distance between the right eye 2R of the second user and the left eye 1L of the first user is less than a distance between the right eye 1R of the first user and the left eye 2L of the second user. In this example, the rendering apparatus may compare the distance between the left eye 2L of the second user and the right eye 1R of the first user and a distance between the right eye 2R of the second user and the left eye 1L of the first user, and may determine an image for the right eye 2R of the second user.

When the distance between the right eye 2R of the second user and the left eye 1L of the first user is less than the distance between the right eye 1R of the first user and the left eye 2L of the second user, the rendering apparatus may determine the number 2 image for the right eye 2R of the second user. The rendering apparatus may determine the number 1 image for the left eye 2L of the second user for 3D display. To guarantee a viewing environment of the first user, crosstalk may occur on the left eye 2L of the second user.

Hereinafter, a process of the rendering apparatus that determines an image based on a position of the right eye 2R of the second user when the left eye 2L of the second user is positioned further to the right than the right eye 1R of the first user and a distance between the right eye 1R of the first user and the left eye 2L of the second user is greater than the minimum separable distance will be described with reference to FIGS. 17F and 17G.

Figure 17F:
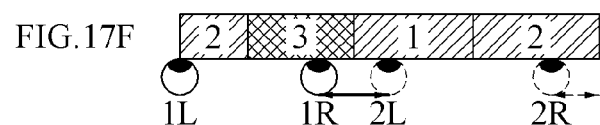

FIG. 17F illustrates an example in which a distance between the right eye 1R of the first user and the left eye 2L of the second user is greater than a distance between the right eye 2R of the second user and the left eye 1L of the first user. In this example, the rendering apparatus may determine the same number 2 image as one for the left eye 1L of the first user for the right eye 2R of the second user and may determine the number 1 image for the left eye 2L of the second user for 3D display. The second user may view a 3D image of 1, 2 pair.

Figure 17G:
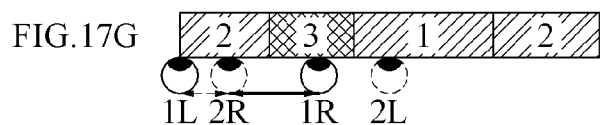

FIG. 17G illustrates an example in which the right eye 2R of the second user is positioned between the left eye 1L and the right eye 1R of the first user and a distance between the right eye 2R of the second user and the left eye 1L of the first user is less than a distance between the right eye 2R of the second user and the right eye 1R of the first user. In this example, the rendering apparatus may determine the number 2 image corresponding to the left eye 1L of the first user for the right eye 2R of the second user, and may determine the number 1 image for the left eye 2L of the second user for 3D display. The second user may view a 3D image of 1, 2 pair.

Hereinafter, a process of the rendering apparatus that determines an image based on a position of the right eye 2R of the second user when the left eye 2L of the second user is positioned further to the right than the right eye 1R of the first user, a distance between the left eye 2L of the second user and the left eye 1L of the first user is less than a distance between the left eye 2L of the second user and the right eye 1R of the first user, and the distance between the left eye 2L of the second user and the left eye 1L of the first user is greater than the minimum separable distance will be described with reference to FIG. 17H and 17I.

Figure 17H:
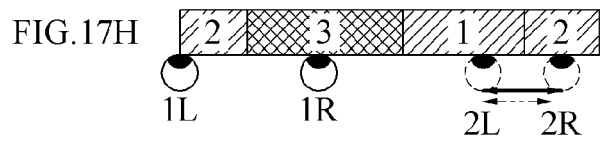

FIG. 17H illustrates an example in which the right eye 2R of the second user is positioned between the left eye 2L of the second user and the left eye 1L of the first user and a distance between the right eye 2R and the left eye 2L of the second user is greater than the minimum separable distance. In this example, since separate images may be displayed on the left eye 2L and the right eye 2R of the second user, the rendering apparatus may determine the same number 2 image as one for the left eye 1L of the first user for the right eye 2R of the second user and may determine the number 1 image for the left eye 2L of the second user. The second user may view a 3D image of 1, 2 pair.

Figure 17I:
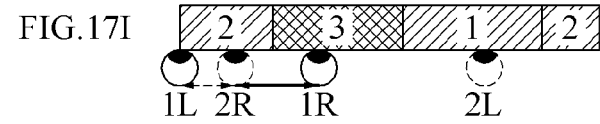

FIG. 17I illustrates an example in which the right eye 2R of the second user is positioned between the left eye 1L and the right eye 1R of the first user and a distance between the right eye 2R of the second user and the left eye 1L of the first user is less than a distance between the right eye 2R of the second user and the right eye 1R of the first user. In this example, the rendering apparatus may determine the same number 2 image as one for the left eye 1L of the first user for the right eye 2R of the second user and may determine the number 1 image for the left eye 2L of the second user. The second user may view a 3D image of 1, 2 pair.

Figure 18:
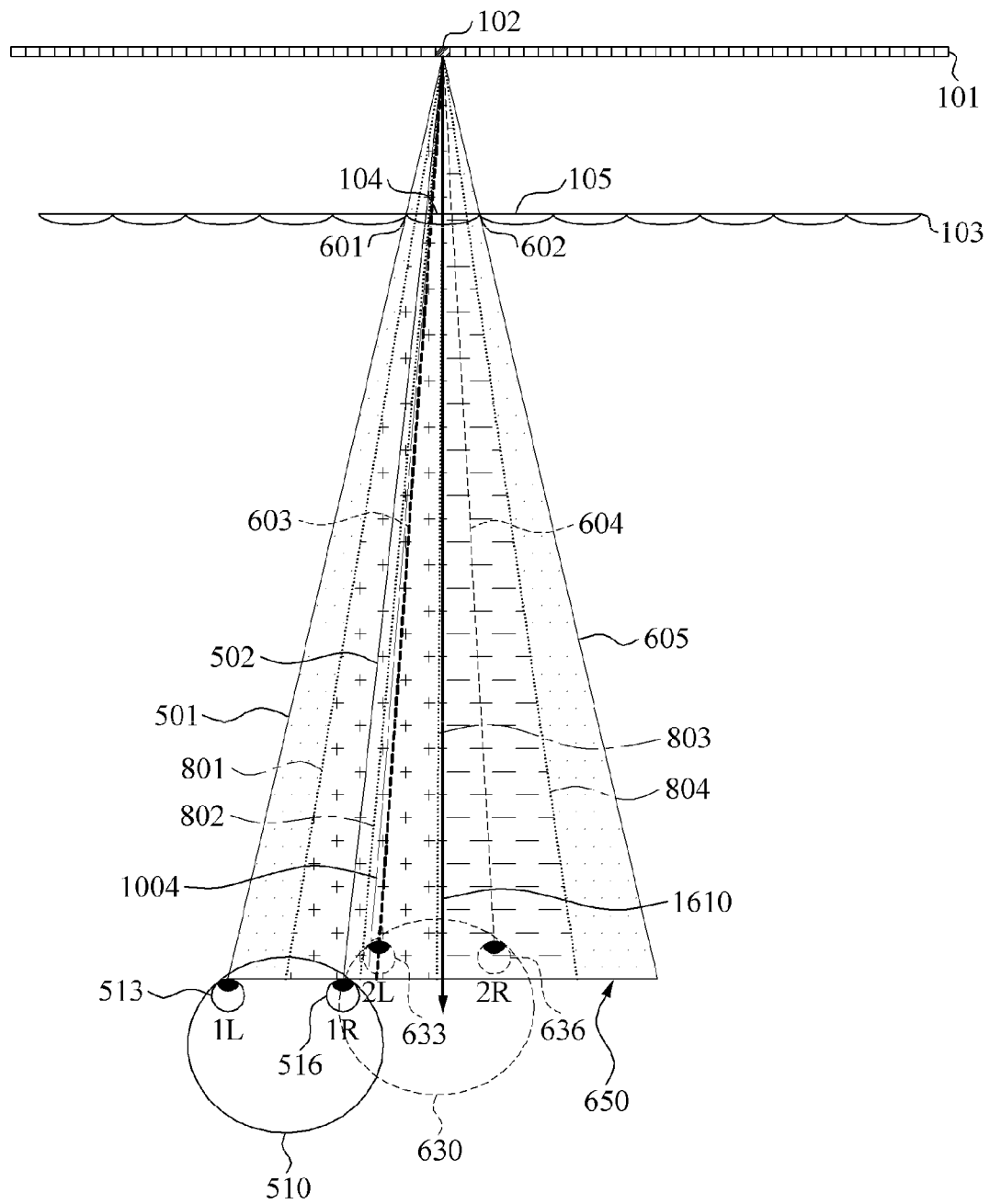
FIG. 18 illustrates a process of a light field rendering apparatus that determines a value of a subpixel according to at least one example embodiment.

FIG. 18 illustrates a process of a rendering apparatus that determines a value of a subpixel according to at least one example embodiment. FIG. 18 illustrates a ray direction 1610 from the subpixel 102.

The rendering apparatus may determine a ray direction corresponding to a view that constitutes a multi-view image among quantized ray directions from the subpixel 102 as a ray direction of the subpixel 102. The rendering apparatus may determine a value of the subpixel 102 based on contents of a sub-view area corresponding to a ray direction of the subpixel 102.

The rendering apparatus may determine contents corresponding to a sub-view area to which the ray direction 1610 belongs among sub-view areas corresponding to a ray direction range of the subpixel 102.

For example, referring to FIG. 18, the direction 603 toward the left eye 2L 633 of the second user 630 is relatively close to the direction 1004 corresponding to a boundary of the ray direction range. Thus, when an image displayed on the right eye 1R 516 of the first user 510 differs from an image displayed on the left eye 2L 633 of the second user 630, crosstalk is highly likely to occur on the left eye 2L 633 of the second user 630.

If it is possible to provide the same image for the right eye 1R 516 of the first user 510 and the left eye 2L 633 of the second user 630 and at the same time, to provide an appropriate image for the left eye 2L 633 and the right eye 2R 636 of the second eye 630, the rendering apparatus may provide the second user 630 with an image in which relatively small artifact is present. Accordingly, the rendering apparatus may set contents so that the same image may be viewed at the right eye 1R 516 of the first user 510 and the left eye 2L 633 of the second user 630.

When ray direction ranges for both eyes of users and contents to be displayed on both eyes are determined, the rendering apparatus may determine an image for an eye to be represented by light corresponding to the ray direction 1610 from the subpixel 102.

The rendering apparatus may determine an image by selecting a sub-view area that includes the ray direction 1610 from among the determined ray direction ranges. Referring to FIG. 18, since the ray direction 1610 belongs to the ray direction range for the right eye 2R 636 of the second user 630, the subpixel 102 may be determined to display an image to be viewed at the right eye 2R 636 of the second user 630.

When a ray direction from the subpixel 102 is determined through the above process, the rendering apparatus may determine contents only for an eye of a user that belongs to a ray direction during a contents determining processing.

The rendering apparatus may perform the above process for all of subpixels included in the panel 101, and may provide a 3D image to the first user 510 and may also provide the 3D image to the second user 630 as smoothly as possible.

Figure 19:
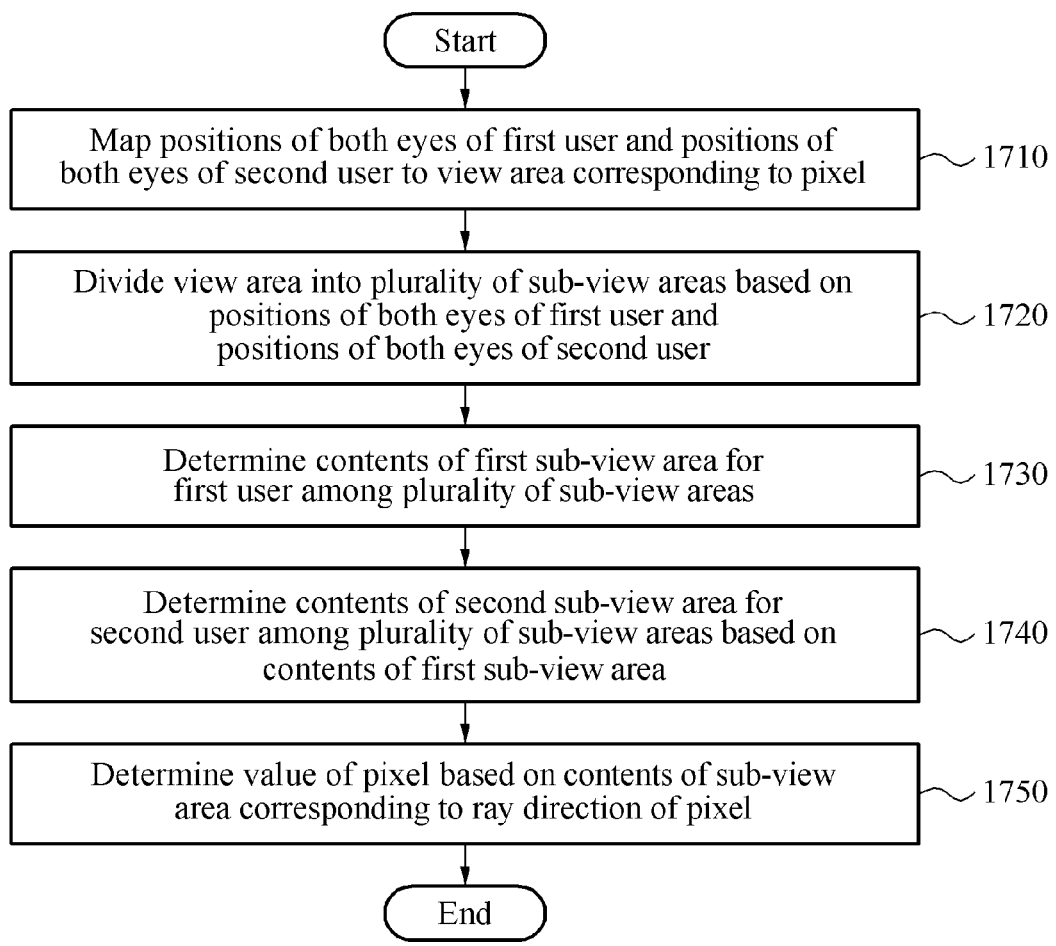
FIG. 19 is a flowchart illustrating another example of a light field rendering method according to at least one example embodiment.

FIG. 19 is a flowchart illustrating another example of a light field rendering method according to at least one example embodiment. Referring to FIG. 19, in operation 1710, the rendering apparatus maps positions of both eyes of a first user and positions of both eyes of a second user to a view area corresponding to a pixel. Here, mapping positions of both eyes to a view area corresponding to a pixel may be understood as a meaning of mapping positions of both eyes of a user to a view area corresponding to a single view cone based on a single pixel to be processed. Also, when rendering is performed based on a subpixel unit, the term "pixel" used in FIG. 19 may be understood as a subpixel.

In operation 1720, the rendering apparatus may divide the view area into a plurality of sub-view areas based on the positions of both eyes of the first user and the positions of both eyes of the second user. In operation 1730, the rendering apparatus may determine contents of a first sub-view area for the first user among the plurality of sub-view areas.

In operation 1740, the rendering apparatus may determine contents of a second sub-view area for the second user among the plurality of sub-view areas based on the contents of the first sub-view area. In operation 1750, the rendering apparatus may determine the value of the pixel based on contents of a sub-view area corresponding to a ray direction of the pixel.

Figure 20:
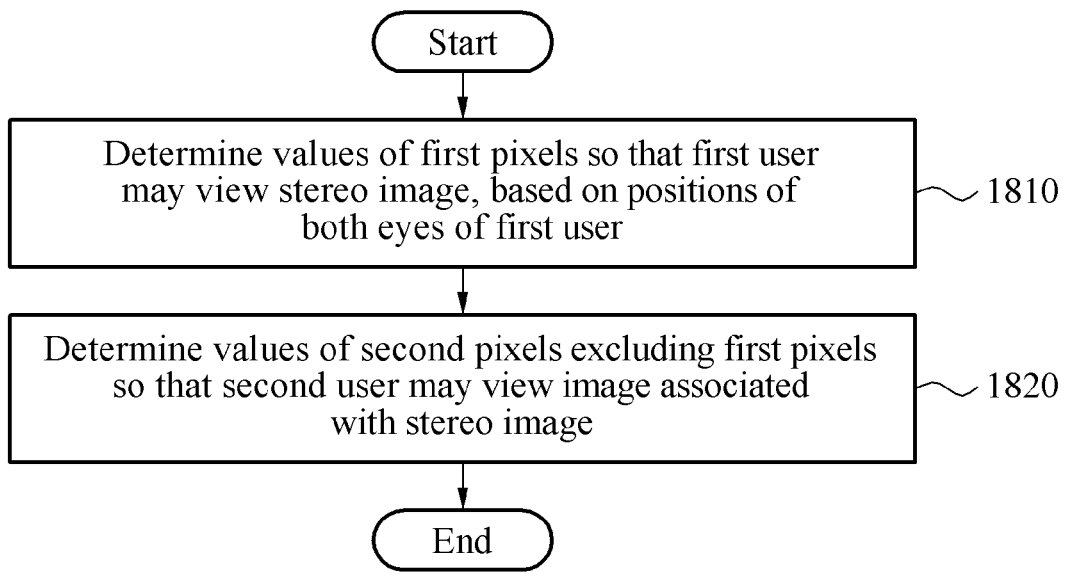
FIG. 20 is a flowchart illustrating still another example of a light field rendering method according to at least one example embodiment.

FIG. 20 is a flowchart illustrating still another example of a light field rendering method according to at least one example embodiment. Referring to FIG. 20, in operation 1810, the rendering apparatus may determine values of first pixels so that a first user may view a stereo image, based on positions of both eyes of the first user.

In operation 1820, the rendering apparatus may determine values of second pixels excluding the first pixels so that a second user may view an image associated with the stereo image, based on a correlation between the positions of both eyes of the first user and the positions of both eyes of the second user. Here, when the positions of both eyes of the first user and the positions of both eyes of the second user are mapped to a desired (or alternatively, predefined) view area, the correlation may include, for example, an order in which the mapped positions are arranged and distances between the mapped positions.

For example, the image associated with the stereo image may be a stereo image. In this example, the second user may view the same stereo image as the stereo image being viewed by the first user. As another example, the image associated with the stereo image may be a left image of the stereo image. In this example, the second user may view a mono image corresponding to the left image of the stereo image being viewed by the first user. As another example, the image associated with the stereo image may be a right image of the stereo image. In this example, the second user may view a mono image corresponding to the right image of the stereo image.

As another example, the image associated with the stereo image may be a stereo image of a further left view than the stereo image. In this example, the left image of the stereo image being viewed by the first user may be displayed on the right eye of the second user and an image of a further left view than the left image of the stereo image being viewed by the first user may be displayed on the left eye of the second user. As another example, the image associated with the stereo image may be a stereo image of a further right view than the stereo image. In this example, the right image of the stereo image being viewed by the first user may be displayed on the left eye of the second user and an image of a further right view than the right image of the stereo image being viewed by the first user may be displayed on the right eye of the second user.

In operation 1820, the rendering apparatus may determine the values of second pixels to display a left image or a right image of the stereo image at one or more positions of both eyes of the second user. Some example embodiments provide a rendering algorithm for displaying an image based on positions of both eyes of users at the rendering apparatus.

When rendering is performed based on a subpixel unit, the term "pixel" of FIG. 20 may be understood as a subpixel.

Figure 21:
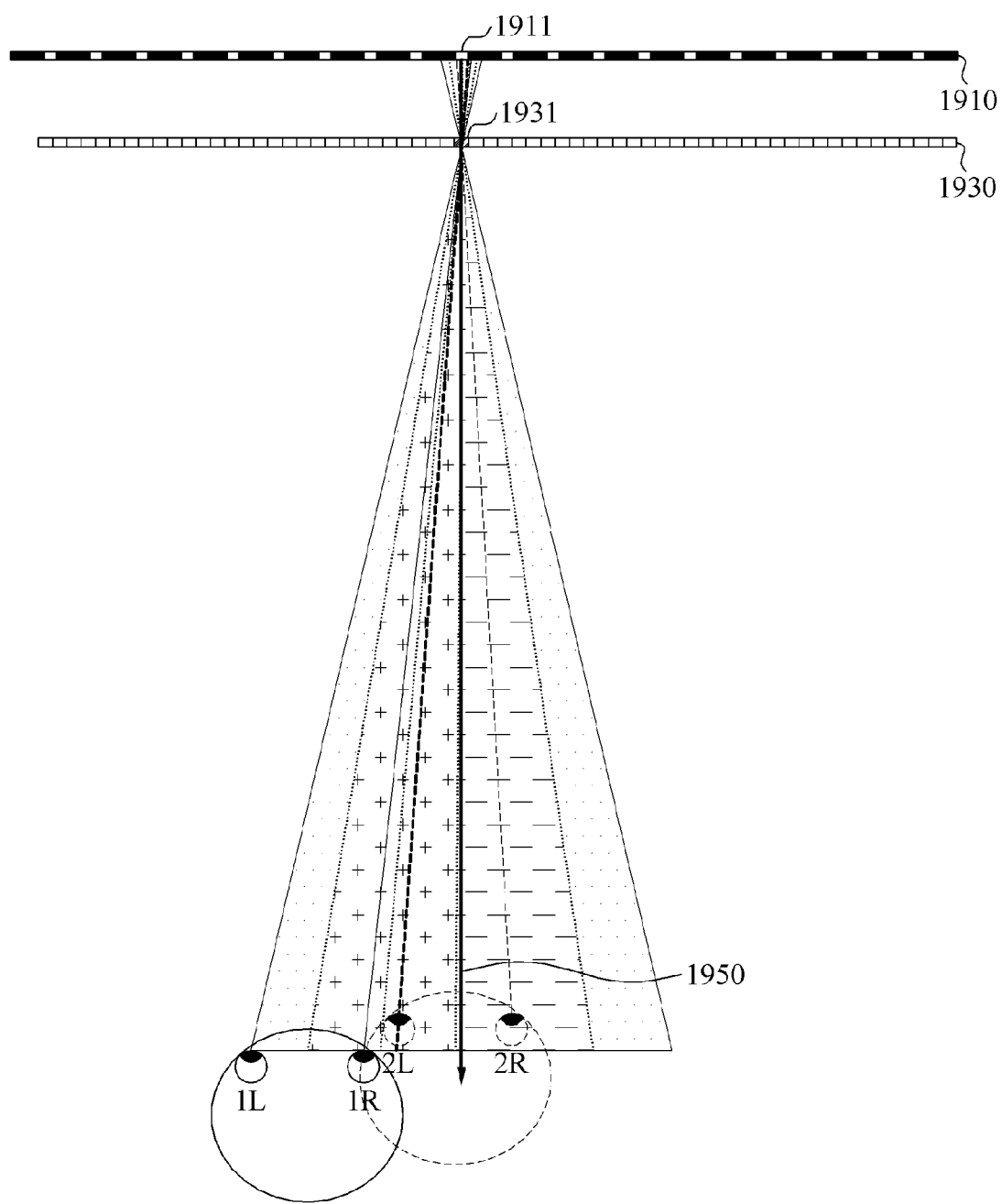
FIG. 21 illustrates a process of a light field rendering apparatus that includes two optical layers according to at least one example embodiment.

FIG. 21 illustrates an example in which an optical layer of a rendering apparatus is disposed at the rear of a display according to at least one example embodiment.

FIG. 21 illustrates a rendering apparatus that includes a parallax barrier 1910 corresponding to an optical layer at the rear of a transmission type panel 1930. Similar to the optical layer 103 with respect to the panel 101 of FIG. 1, the parallax barrier 1910 at the rear of the transmission type panel 1930 may limit a direction of light from a subpixel 1931 based on a relationship between a unit position 1911 of an optical layer and a position of the subpixel 1931.

In this example, the rendering apparatus may determine contents corresponding to a sub-view area that includes a ray direction 1950 passing through the subpixel 1931 of the transmission type panel 1930 corresponding to a ray direction of the unit position 1911 included in the parallax barrier 1910 so that the contents may correspond to one of both eyes of users.

Figure 22:
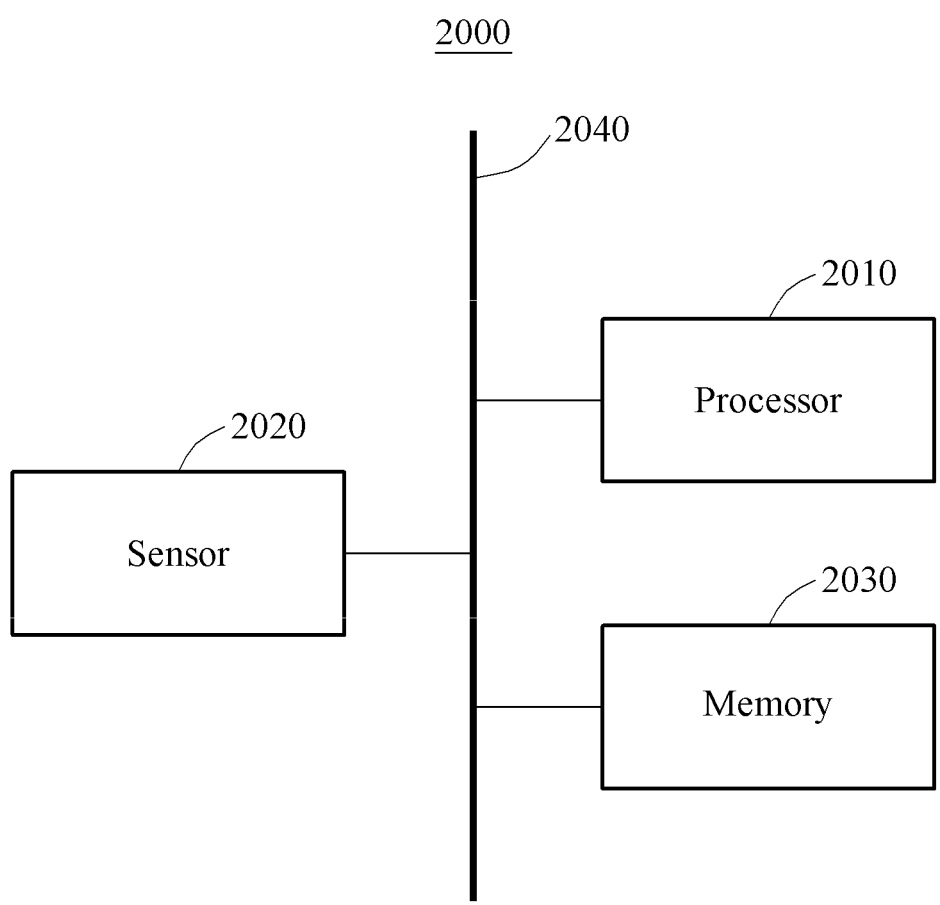
FIG. 22 is a block diagram illustrating a light field rendering apparatus according to at least one example embodiment.

FIG. 22 is a block diagram illustrating a rendering apparatus according to at least one example embodiment.

Referring to FIG. 22, the rendering apparatus 2000 includes a processor 2010 and a sensor 2020. The processor 2010 and the sensor 2020 may communicate with each other through a bus 2040.

The sensor 2020 photographs a first user and a second user. The sensor 2020 may be, for example, an image sensor. The processor 2010 maps positions of both eyes of the first user and positions of both eyes of the second user to a view area corresponding to a subpixel, and determines a value of the subpixel based on the mapped positions of both eyes of the first user and positions of both eyes of the second user.

According to at least one example embodiment, the processor 2010 is configured to determine a first viewing area associated with a region of a display for displaying an image to a first user. The processor 2010 is configured to convert positions of eyes of a second user from a second viewing area to the first viewing area. The processor 2010 is configured to determine a value of the region based on the converted positions of eyes of the second user and actual positions of eyes of the first user.

The processor 2010 is configured to render the image such that the region has the determined value to display a corresponding part of the image.

According to at least one example embodiment, the image is a stereo image including a plurality view images, and the processor 2010 is configured to determine the value of the region based on i) one or more of the plurality of view images, ii) a relationship between the converted positions and the actual positions, and iii) a ray direction of the region, the ray direction being a direction in which light passes from the region through a center of an optical element associated with the display.

The region may be a pixel, and the first viewing area may be a first viewing cone of the pixel. The second viewing area may be a second viewing cone of the pixel.

Alternatively, the region may be a sub-pixel of a pixel, and the first viewing area may be a first viewing cone of the sub-pixel. The second viewing area may be a second viewing cone of the sub-pixel.

The processor 2010 may perform one or more methods described above with reference to FIGS. 1 through 21 or an algorithm corresponding thereto. The rendering apparatus 2000 may further include a memory 2030. The memory 2030 may store a value of a subpixel determined by the processor 2010. The memory 2030 may be, for example, a volatile memory or a non-volatile memory.

The processor 2010 may execute a program and may control an electronic system. A program code (or computer readable instructions) that corresponds to the above described operations/algorithms and executed by the processor 2010 may be stored in the memory 2030. That is, the processor 2010 may be a special purpose processor. The processor 2010 may be connected to an external apparatus, for example, a personal computer or a network through an input/output (I/O) apparatus (not shown), and may exchange data. The rendering apparatus 2000 may include a variety of electronic systems, for example, a TV and a smart TV.

Although the processor 2010 is shown as being within the same apparatus as the sensor 2020 and memory 2030, example embodiments are not limited thereto. For example, the processor 2010 may embodied as a separate device in, for example, a dongle with appropriate data interfaces (Universal Serial Bus interface, High-Definition Multimedia Interface, etc.) for interfacing with external devices including the sensor 2020 and the memory 2030 through the bus 2040. Further, the processor 2010 and the memory 2030 may be embodied within the dongle while the sensor 2020 is an external device.

The example embodiments described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor (e.g., a special purpose processor), a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rendering method for a plurality of users, the method comprising:
   mapping positions of a left eye and a right eye of a first user and positions of a left eye and a right eye of a second user to a desired viewing area of a three-dimensional (3D) display device using a sensor;
   detecting an order of each of the left eye and the right eye of the first user and the left eye and the right eye of the second user relative to one another; and
   determining an image value for the desired viewing area based on the detected order of the left eye and the right eye of the first user and the left eye and the right eye of the second user, and a distance between the mapped positions of the left eye and the right eye of the first user and the mapped positions of the left eye and the right eye of the second user, the determining including,
      determining, for the first user, pixel resources of the image value based on the mapped positions of the left eye and the right eye of the first user so that the first user views a 3D image, and
      determining, for the second user whose priority is lower than a priority of the first user, remaining pixel resources of the image value based on the detected under and the distance between the mapped positions.

2. The method of claim 1, wherein the desired viewing area comprises a viewing cone, the viewing cone corresponding to a pair including a pixel and an optical element included in an optical layer.

3. The method of claim 1, wherein the mapping comprises mapping the positions of the left eye and the right eye of the first user and the positions of the left eye and the right eye of the second user to the desired viewing area based on relative positions between a pixel and optical elements included in an optical layer.

4. The method of claim 1, wherein the determining comprises:
   determining the image value for the desired viewing area to display a stereo image at the mapped positions of the left eye and the right eye of the first user if a ray direction of the desired viewing area corresponds to the first user; and
   determining the image value for the desired viewing area to display a left image or a right image of the stereo image at a mapped position of at least one of the left eye and the right eye of the second user if the ray direction corresponds to the second user.

5. The method of claim 4, wherein the ray direction comprises a ray direction that is propagated through a pixel and an optical element included in an optical layer.

6. The method of claim 1, wherein the determining comprises:
   determining the image value for the desired viewing area based on a left image of a stereo image if a ray direction of the desired viewing area corresponds to a mapped position of a left eye of the first user; and
   determining the image value for the desired viewing area based on a right image of the stereo image if the ray direction corresponds to a mapped position of a right eye of the first user.

7. The method of claim 1, wherein the determining comprises:
   determining the image value for the desired viewing area based on a left image of a stereo image for the first user if a ray direction of the desired viewing area corresponds to a mapped position of a left eye of the second user and the mapped position of the left eye of the second user corresponds to a mapped position of a left eye of the first user; and
   determining the image value for the desired viewing area based on a right image of the stereo image if the ray direction corresponds to the mapped position of the left eye of the second user and the mapped position of the left eye of the second user corresponds to a mapped position of a right eye of the first user.

8. The method of claim 1, wherein the determining comprises:
   determining the image value for the desired viewing area based on a left image of a stereo image for the first user or an image of a further left view than the left image if a ray direction of the desired viewing area corresponds to a mapped position of a left eye of the second user and a mapped position of a right eye of the second user corresponds to a mapped position of a left eye of the first user; and
   determining the image value for the desired viewing area based on the left image or a right image of the stereo image if the ray direction corresponds to the mapped position of the left eye of the second user and the mapped position of the right eye of the second user corresponds to a mapped position of a right eye of the first user.

9. The method of claim 1, wherein the determining comprises:
   determining the image value for the desired viewing area based on a left image of a stereo image for the first user if a ray direction of the desired viewing area corresponds to a mapped position of a right eye of the second user and the mapped position of the right eye of the second user corresponds to a mapped position of a left eye of the first user; and
   determining the image value for the desired viewing area based on a right image of the stereo image if the ray direction corresponds to the mapped position of the right eye of the second user and the mapped position of the right eye of the second user corresponds to a mapped position of a right eye of the first user.

10. The method of claim 1, wherein the determining comprises:
    determining the image value for the desired viewing area based on a left image of a stereo image for the first user or a right image of the stereo image if a ray direction of the desired viewing area corresponds to a mapped position of a right eye of the second user and a mapped position of a left eye of the second user corresponds to a mapped position of a left eye of the first user; and
    determining the image value for the desired viewing area based on the right image or an image of a further right view than the right image if the ray direction corresponds to the mapped position of the right eye of the second user and a mapped position of a left eye of the second user corresponds to a mapped position of a right eye of the first user.

11. The method of claim 1, wherein the determining comprises:
dividing the desired viewing area into a plurality of sub-viewing areas based on the mapped positions of the left eye and the right eye of the first user and the mapped positions of the left eye and the right eye of the second user; and
determining the image value of the desired viewing area based on contents of a sub-viewing area corresponding to a ray direction of the desired viewing area.

12. The method of claim 11, wherein the determining comprises:
determining contents of a first sub-viewing area for the first user from among the plurality of sub-viewing areas; and
determining contents of a second sub-viewing area for the second user from among the plurality of sub-viewing areas based on the contents of the first sub-viewing area.

13. A rendering method for a plurality of users, the method comprising:
mapping positions of a right eye and a left eye of a first user and positions of a right eye and a left eye of a second user;
detecting an order of each of the right eye and the left eye of the first user and the right eye and the left eye of the second user relative to one another;
determining image values for first pixels of a three-dimensional (3D) display device to display a stereo image at the mapped positions of the right eye and the left eye of the first user; and
determining image values for second pixels of the 3D display device to display an image associated with the stereo image at positions of the right eye and the left eye of the second user based on the detected order of the right eye and the left eye of the first user and the right eye and the left eye of the second user, and distances between the mapped positions of the right eye and the left eye of the first user and the right eye and the left eye of the second user, the second pixels excluding the first pixels; and wherein
the determining the image values for the first pixels further includes determining, for the first user, pixel resources of the image values for the first pixels based on the mapped positions of the left eye and the right eye of the first user so that the first user views a 3D image, and
the determining the image values for the second pixels further includes determining, for the second user whose priority is lower than a priority of the first user, remaining pixel resources of the image values for the second pixels based on the detected order and the distance between the mapped positions.

14. The method of claim 13, wherein the image associated with the stereo image comprises at least one of the stereo image, a left image of the stereo image, a right image of the stereo image, a stereo image of a further left view than the stereo image, and a stereo image of a further right view than the stereo image.

15. The method of claim 13, wherein the determining the image values for the second pixels comprises determining the image values for the second pixels to display a left image or a right image of the stereo image at one or more positions of the right eye and the left eye of the second user.

16. A non-transitory computer readable medium including computer readable instructions, which when executed by at least one processor, causes the at least one processor to implement the method of claim 1 in combination with hardware.

17. A rendering apparatus for a plurality of users, comprising:
a sensor configured to capture first user information corresponding to a left eye and a right eye of a first user and second user information corresponding to a left eye and a right eye of a second user; and
at least one processor configured to,
map positions of the left eye and the right eye of the first user and positions of the left eye and the right eye of the second user using the first user information and the second user information in relation to a viewing area, the viewing area corresponding to a pixel of a three-dimensional (3D) display device,
detect an order of each of the left eye and the right eye of the first user and the left eye and the right eye of the second user relative to one another, and
determine an image value for the viewing area based on the detected order of the left eye and the right eye of the first user and the left eye and the right eye of the second user, and distances between the mapped positions of the left eye and the right eye of the first user and the left eye and the right eye of the second user, the determination including,
determining, for the first user, pixel resources of the image value based on the mapped positions of the left eye and the right eye of the first user so that the first user views a 3D image, and
determining, for the second user whose priority is lower than a priority of the first user, remaining pixel resources of the image value based on the detected order and the distance between the mapped positions.

18. The rendering apparatus of claim 17, wherein the at least one processor is configured to,
determine the image value for the viewing area based on a left image of a stereo image if a ray direction of the viewing area corresponds to a mapped position of a left eye of the first user, and
determine the image value for the viewing area based on a right image of the stereo image if the ray direction corresponds to a mapped position of a right eye of the first user.

19. The rendering apparatus of claim 17, wherein the at least one processor is configured to,
determine the image value for the viewing area based on a left image of a stereo image for the first user if a ray direction of the viewing area corresponds to a mapped position of a left eye of the second user and the mapped position of the left eye of the second user corresponds to a mapped position of a left eye of the first user, and
determine the image value for the viewing area based on a right image of the stereo image if the ray direction of the viewing area corresponds to the mapped position of the left eye of the second user and the mapped position of the left eye of the second user corresponds to a mapped position of a right eye of the first user.

20. The rendering apparatus of claim 17, wherein the at least one processor is configured to,
determine the image value for the viewing area based on a left image of a stereo image for the first user or an image of a further left view than the left image if a ray direction of the viewing area corresponds to a mapped position of a left eye of the second user and a mapped position of a right eye of the second user corresponds to a mapped position of a left eye of the first user, and determine the image value for the viewing area based on the left image or a right image of the stereo image if the ray direction corresponds to the mapped position of the left eye of the second user and a mapped position of a right eye of the second user corresponds to a mapped position of a right eye of the first user.

21. The rendering apparatus of claim 17, wherein the at least one processor is configured to, determine the image value for the viewing area based on a left image of a stereo image for the first user if a ray direction of the viewing area corresponds to a mapped position of a right eye of the second user and the mapped position of the right eye of the second user corresponds to a mapped position of a left eye of the first user, and determine the image value for the viewing area based on a right image of the stereo image if the ray direction corresponds to the mapped position of the right eye of the second user and the mapped position of the right eye of the second user corresponds to a mapped position of a right eye of the first user.

22. The rendering apparatus of claim 17, wherein the at least one processor is configured to, determine the image value for the viewing area based on a left image of a stereo image for the first user or a right image of the stereo image if a ray direction of the viewing area corresponds to a mapped position of a right eye of the second user and a mapped position of a left eye of the second user corresponds to a mapped position of a left eye of the first user, and determine the image value for the viewing area based on the right image or an image of a further right view than the right image if the ray direction corresponds to the mapped position of the right eye of the second user and a position of a left eye of the second user corresponds to a mapped position of a right eye of the first user.

23. The rendering apparatus of claim 17, wherein the at least one processor is configured to, divide the viewing area into a plurality of sub-viewing areas based on the mapped positions of both eyes of the first user and the mapped positions of both eyes of the second user, and determine the image value of the viewing area based on contents of a sub-viewing area corresponding to a ray direction of the viewing area.

24. The rendering apparatus of claim 23, wherein the at least one processor is configured to, determine contents of a first sub-viewing area for the first user among the plurality of sub-viewing areas, and determine contents of a second sub-viewing area for the second user among the plurality of sub-viewing areas based on the contents of the first sub-viewing area.

25. An apparatus, comprising:

at least one processor; and a memory including computer readable instructions, which when executed by the at least one processor, causes the at least one processor to, capture first user information related to a left eye and a right eye of a first user and second user information related to a left eye and a right eye of a second user using a sensor, detect an order of each of the left eye and the right eye of the first user and the left eye and the right eye of the second user relative to one another based on the first user information and the second user information, determine a first viewing area associated with a region of a three-dimensional (3D) display for displaying an image to the first user, convert positions of the left eye and the right eye of the second user from a second viewing area to the first viewing area, and determine an image value for the region based on the detected order of the left eye and the right eye of the first user and the left eye and the right eye of the second user, and distances between the actual positions of the left eye and the right eye of the first user and the converted positions left eye and the right eye of the second user, the determination including, determining, for the first user, pixel resources of the image value based on the mapped positions of the left eye and the right eye of the first user so that the first user views a 3D image, and determining, for the second user whose priority is lower than a priority of the first user, remaining pixel resources of the image value based on the detected order and the distance between the mapped positions.

26. The apparatus of claim 25, wherein the computer readable instructions, when executed by the at least one processor, causes the at least one processor to render the image such that the region has the determined image value in order to display a corresponding part of the image.

27. The apparatus of claim 25, wherein the image is a stereo image including a plurality view images, and the computer readable instructions, when executed by the at least one processor, causes the at least one processor to:

determine the image value of the region based on i) one or more of the plurality of view images, ii) a relationship between the converted positions and the actual positions, and iii) a ray direction of the region, the ray direction being a direction in which light passes from the region through a center of an optical element associated with the display.

* * * * *